US012561200B2

(12) United States Patent
Del Gatto et al.

(10) Patent No.: US 12,561,200 B2
(45) Date of Patent: Feb. 24, 2026

(54) READ DATA PATH

(71) Applicant: Micron Technology, Inc., Boise, ID (US)

(72) Inventors: Nicola Del Gatto, Cassina de Pecchi (IT); Emanuele Confalonieri, Segrate (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/670,167

(22) Filed: May 21, 2024

(65) Prior Publication Data

US 2024/0427660 A1 Dec. 26, 2024

Related U.S. Application Data

(63) Continuation of application No. 17/823,469, filed on Aug. 30, 2022, now Pat. No. 11,989,088.

(51) Int. Cl.
G06F 11/10 (2006.01)
(52) U.S. Cl.
CPC ...... G06F 11/1004 (2013.01); G06F 11/1076 (2013.01)
(58) Field of Classification Search
None
See application file for complete search history.

(56) References Cited

U.S. PATENT DOCUMENTS 6,076,165 A 6/2000 Maenza
10,146,624 B1 * 12/2018 Gong .................. G06F 11/2058

10,521,303 B2 * 12/2019 Kim .................... G06F 11/1096
11,074,016 B2 * 7/2021 Seppanen ............. G06F 3/0608
11,237,893 B2 * 2/2022 Lester ................. G06F 11/0772
11,269,803 B1 * 3/2022 Chou .................. G06F 13/4221
11,307,804 B2 * 4/2022 Ki ........................ G06F 3/0673
11,614,848 B1 * 3/2023 Gilbert .................... G06T 11/00
715/771
11,989,088 B2 5/2024 Del Gatto et al.
12,118,408 B2 10/2024 Armangau et al.
(Continued)

OTHER PUBLICATIONS

"Non-Final Office Action", U.S. Appl. No. 17/823,476, Jan. 31, 2024, 20 pages.

(Continued)

*Primary Examiner* — Daniel F. McMahon
(74) *Attorney, Agent, or Firm* — Colby Nipper PLLC

(57) ABSTRACT

Described apparatuses and methods relate to a read data path for a memory system. The memory system may include logic that receives data and associated metadata from a memory. The logic may perform a reliability check on the data using the associated metadata to determine if the data has an error. If the data is determined not to include an error, the data may be transmitted to a requestor. If the data is determined to include an error, however, a data recovery process may be initiated to recover the data. This may reduce a likelihood the memory system returns corrupted data to a requestor. The memory system may process a different read request at least partially in parallel with the data recovery process to increase throughput or reduce latency. In some cases, the data recovery process may involve one or more techniques related to redundant array of disks (RAID) technology.

20 Claims, 11 Drawing Sheets

(56)  References Cited

U.S. PATENT DOCUMENTS

| | | | |
|---|---|---|---|
| 12,223,199 | B2 | 2/2025 | Chiu |
| 2007/0022273 | A1 | 1/2007 | Naffziger et al. |
| 2009/0187786 | A1 | 7/2009 | Jones et al. |
| 2018/0341606 | A1 | 11/2018 | Bolkhovitin et al. |
| 2019/0227892 | A1 | 7/2019 | Hemmo et al. |
| 2019/0235777 | A1* | 8/2019 | Wang ................... G06F 3/0619 |
| 2020/0133774 | A1 | 4/2020 | Kang et al. |
| 2021/0278998 | A1* | 9/2021 | Li ....................... G06F 12/0246 |
| 2021/0279007 | A1 | 9/2021 | Trika |
| 2021/0326320 | A1 | 10/2021 | Kondiles et al. |
| 2022/0100404 | A1 | 3/2022 | Martinelli et al. |
| 2022/0253536 | A1 | 8/2022 | Ong et al. |
| 2022/0269561 | A1 | 8/2022 | Yoo et al. |
| 2022/0308796 | A1* | 9/2022 | Patriarca .............. G06F 3/0652 |
| 2022/0358016 | A1 | 11/2022 | Park et al. |
| 2023/0033539 | A1 | 2/2023 | Xu |
| 2023/0063992 | A1 | 3/2023 | Shen et al. |
| 2023/0096375 | A1* | 3/2023 | Confalonieri .......... G06F 11/10 |
| | | | 711/154 |
| 2023/0195566 | A1 | 6/2023 | Bueb et al. |
| 2023/0236931 | A1* | 7/2023 | Yang ................... G06F 11/1096 |
| | | | 714/6.24 |
| 2023/0236933 | A1* | 7/2023 | Thirumala .......... G06F 11/1004 |
| | | | 714/6.24 |
| 2023/0280940 | A1* | 9/2023 | Del Gatto ............. G06F 3/0659 |
| 2023/0315315 | A1* | 10/2023 | Ritika ................... G06F 3/0656 |
| | | | 711/154 |
| 2023/0342043 | A1 | 10/2023 | Bao et al. |
| 2023/0409245 | A1 | 12/2023 | Park et al. |
| 2023/0409480 | A1* | 12/2023 | Zhang ................ G06F 12/0828 |
| 2023/0418516 | A1* | 12/2023 | Weiss ................... G06F 3/0656 |
| 2024/0070015 | A1 | 2/2024 | Del Gatto et al. |
| 2024/0070024 | A1 | 2/2024 | Gatto et al. |

OTHER PUBLICATIONS

"Notice of Allowance", U.S. Appl. No. 17/823,469, Jan. 10, 2024, 19 pages.
Blaum, et al., "Reliability of Centralized vs. Parallel Software Models for Composable Storage Systems", Dec. 2021, 9 pages.
"Final Office Action", U.S. Appl. No. 17/823,476, 27 pages.
"Notice of Allowance", U.S. Appl. No. 17/823,476, Jun. 30, 2025, 9 pages.
"Notice of Allowance", U.S. Appl. No. 17/823,476, Nov. 18, 2025, 9 pages.

* cited by examiner

1000

Transmit signaling indicative of a request for first data

1002

Receive signaling indicative of the first data and first metadata effective to enable a reliability check

1004

Perform the reliability check of the first data to determine that the first data does not include an error

1006

Transmit signaling indicative of the first data

1010

Figure 11:
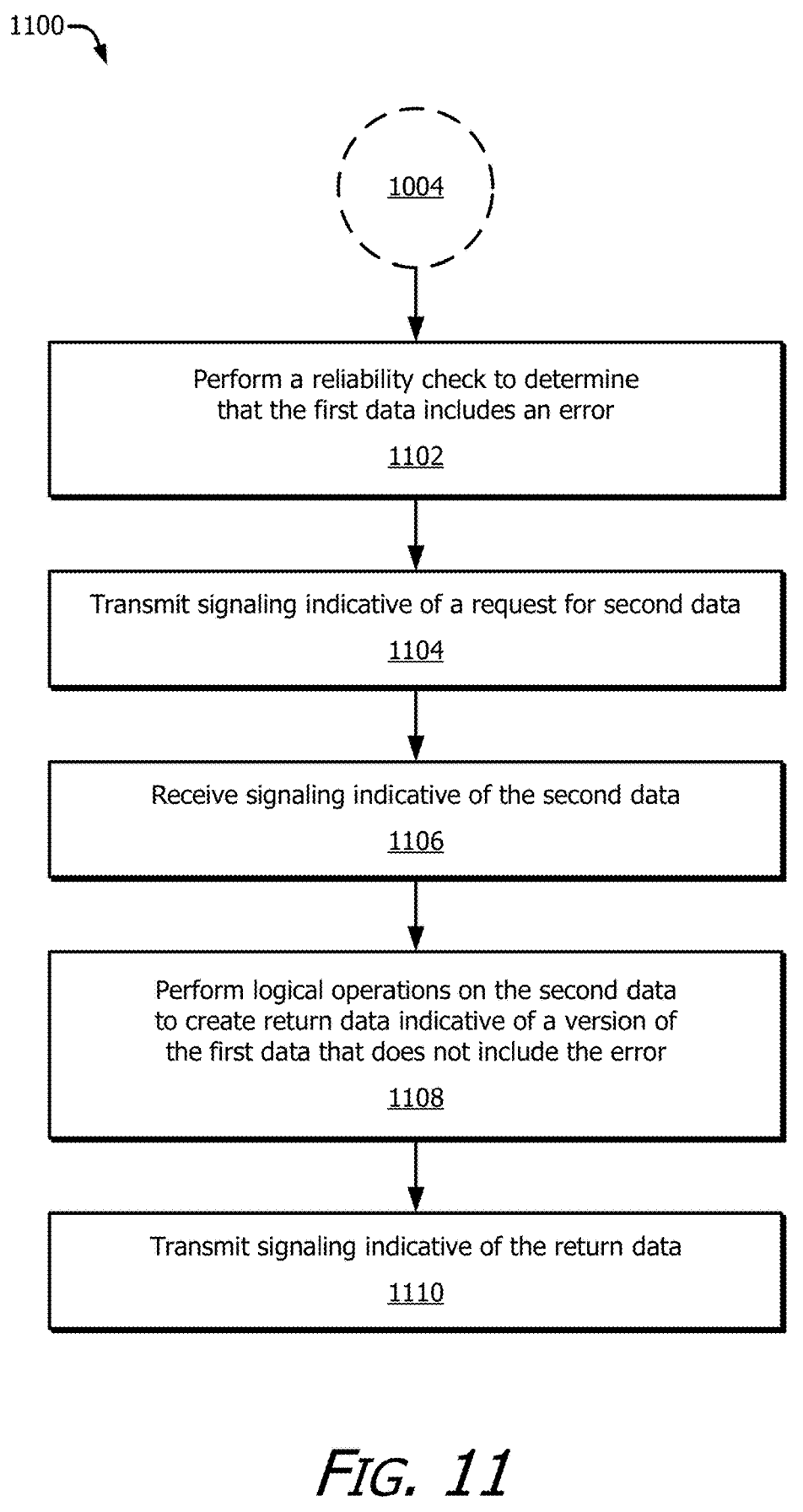

1100 ⌐

( 1004 )

Perform a reliability check to determine
that the first data includes an error

1102

Transmit signaling indicative of a request for second data

1104

Receive signaling indicative of the second data

1106

Perform logical operations on the second data
to create return data indicative of a version of
the first data that does not include the error

1108

Transmit signaling indicative of the return data

READ DATA PATH

RELATED APPLICATION(S)

This application is a continuation of and claims priority to U.S. patent application Ser. No. 17/823,469, filed Aug. 30, 2022, the disclosure of which is incorporated herein by reference in its entirety.

BACKGROUND

Computers, smartphones, and other electronic devices rely on processors and memories. A processor executes code based on data to run applications and provide features to a user. The processor obtains the code and the data from a memory. The memory in an electronic device can include volatile memory (e.g., random-access memory (RAM)) and nonvolatile memory (e.g., flash memory). Like the number of cores or speed of a processor, a rate at which data can be accessed, as well as a delay in accessing it, can impact the performance of an electronic device. This impact on performance increases as processors are developed that execute code faster and as applications on electronic devices operate on ever-larger data sets that require ever-larger memories.

BRIEF DESCRIPTION OF THE DRAWINGS

This document describes apparatuses and techniques for a read data path for a memory system with reference to the following drawings. The same numbers are used throughout the drawings to reference like features and components:

FIG. 11 illustrates an example method for implementing a read operation that includes errors in accordance with one or more aspects of a read data path for a memory system.

DETAILED DESCRIPTION

Overview

Figure 1:
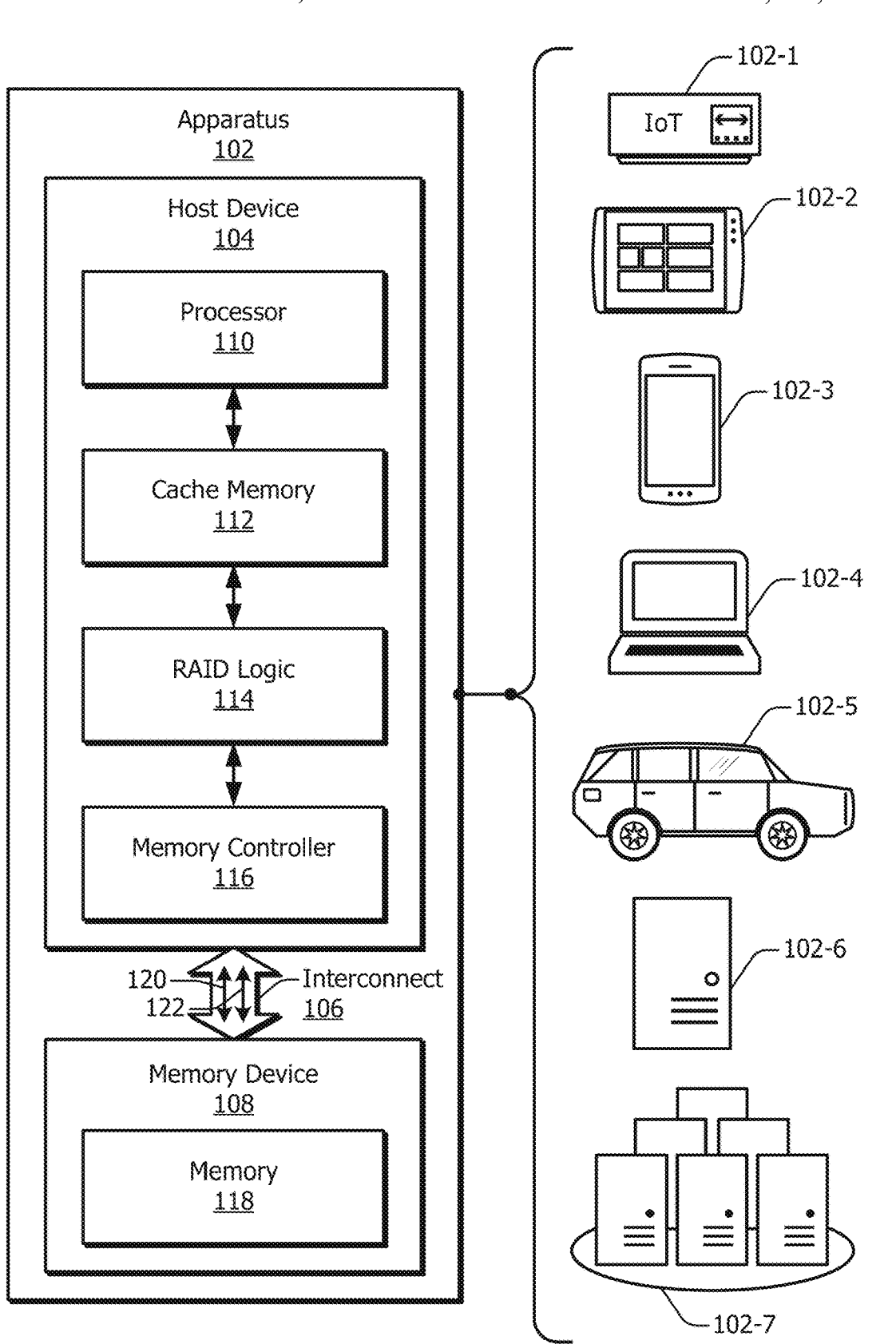
FIG. 1 illustrates an example operating environment including apparatuses that can implement a read data path for a memory system.

As electronic devices continue to improve, memory devices are continually driven to maintain larger amounts of data. Further, improved communications protocols are being developed to support higher rates of data transfer between processors and these memory devices. An example of such an improved protocol is the Compute Express Link® (CXL®) protocol or standard (referred to hereinafter as "the CXL protocol" or "the CXL standard"). The CXL protocol can be implemented over a physical layer that is governed by, for instance, the PCIe® (Peripheral Component Interconnect Express) protocol. The CXL protocol targets intensive workloads for processors and memory devices (e.g., accelerators, memory expanders), where efficient, coherent memory accesses or interactions between processors and memory is advantageous.

The CXL protocol addresses some of the limitations of PCIe links by providing an interface that leverages, for example, the PCIe 5.0 physical layer and electricals, while providing lower-latency paths for memory access and coherent caching between processors and memory devices. It offers high-bandwidth, low-latency connectivity between host devices (e.g., processors, CPUs, SoCs) and memory devices (e.g., accelerators, memory expanders, memory buffers, smart input/output (I/O) devices). The CXL protocol also addresses growing high-performance computational workloads by supporting heterogeneous processing and memory systems with potential applications in artificial intelligence, machine learning, communication systems, and other high-performance computing. With the increase in memory density to utilize improved communication protocols, such as CXL, memory devices may be designed with additional design constraints that create new challenges within the memory device.

Generally, memory devices may be implemented in different forms and deployed in various environments. For example, memory devices can be secured to a printed circuit board (PCB), such as a motherboard. The PCB can include sockets for accepting at least one processor and one or more memories and can include various wiring infrastructure that enables communication between two or more components. The PCB, however, offers a finite area for the sockets and the wiring infrastructure. Some PCBs include multiple sockets that are shaped into linear slots and are designed to accept multiple double-inline memory modules (DIMMs). These sockets can be fully occupied by DIMMs while a processor is still able to utilize more memory. In such situations, if more memory were available, the system could have improved performance, for example, by providing enhanced features, such as high-resolution graphics and artificial intelligence.

To enable a higher memory capacity to be implemented on a similarly sized device, memory density has continued to increase. Take, for example, double data rate synchronous dynamic random-access memory (DDR SDRAM), including low-power DDR (LPDDR) SDRAM, and more specifically LPDDR5. In the LPDDR5 standard, memory density may be so high that data bit errors become increasingly likely. These errors, when left uncorrected, may cause a memory device to return incorrect data that is then improperly relied upon for circuit operations. Thus, in some circumstances, it may be important to develop a solution to provide reliable data in response to a data request, particularly in devices that utilize high-density memory.

One such solution to ensure the reliability of data returned from memory is a redundant array of independent disks (RAID) technique. The RAID technique may involve memory being arranged in blocks such that data, which may be related from a reliability perspective, are stored at corresponding addresses within multiple memory ranks. Here, the memory ranks may be analogous to magnetic disk drives. These sets of related data may be referred to as a RAID stripe, which may be used to recover data that has been corrupted within one of the memory ranks. A RAID stripe may be configured such that data held by a particular memory rank may be represented by, or reproducible from, a combination of the other data within the RAID stripe. Through this configuration of memory, the reliability of data may be increased to reduce the likelihood of propagating data errors through a computing device. This can also protect against the failure of a memory device or rank.

In addition to involving a particular memory configuration, designing logic to detect corrupted data and recover the uncorrupted data within a data path may pose significant challenges. Specifically, memory devices may receive continuous requests for data from a processor or other requestor, with each request potentially targeted data from different memory locations for different functions. The return of such data may be carefully enhanced to satisfy the bandwidth and latency requirements of today's communications protocols that enable vast improvements in the performance of computing devices. These speed-focused data paths, however, may provide little opportunity to implement data reliability checks, which may include a memory device performing logical operations and/or retrieving other data from memory when an error is detected. The execution of additional logical operations or the retrieval of other data to recover from corrupted data may increase the latency of a memory returning requested data, the increased latency may adversely affect the performance of computing devices relying on the memory.

To combat these challenges, techniques, apparatuses, and systems for a read data path are described. The techniques may utilize a backend data return logic that may implement a reliability check before transferring the data to a cache. Data may be stored in memory with accompanying metadata that can be used to perform at least one reliability check. When data is received from the memory, the associated metadata may also be received in such a way as to enable a reliability check of the data. Once the metadata is used during the reliability check, the logic may determine whether an error has occurred or is present within the data before passing the data to the cache where it can be stored for access by the processor or another component of a memory system.

When the logic detects an error within data returned from the memory, the data may be discarded or not otherwise forwarded to the cache. Instead, an indication of the error may be passed to a RAID controller that transmits subsequent memory requests effective to retrieve other data from the memory that may be used to recover the corrupted data. The memory may be configured to store data within individual RAID stripes, which can allow corrupted data to be recovered through logical combinations of the other data stored within a particular RAID stripe. The RAID controller may access these other data in response to the detection of an error within data returned from a same RAID stripe during a previous memory data return. These other data may be passed to logic that can perform a data recovery operation at least partially in parallel with subsequent data requests received at the memory device to reduce the latency of memory returns.

Specifically, the logic may include a no-error data path that propagates signaling from the memory to a cache memory. Additionally, the logic may include a parallel data path that implements a data recovery process when an error is detected in data received from memory. Using the example described above, the other data may be retrieved from the RAID stripe to recover data that has been determined to include an error. This other data may be propagated along parallel data paths that perform one or more logical operations on the other data to recover the corrupted data. These parallel data paths may propagate signals indicative of the other data concurrent with signals indicative of data retrieved as a result of subsequent read requests. The logic may arbitrate between the parallel data paths to provide return data in an efficient way that limits adverse effects on system performance.

As described above, techniques for a read data path may enable a memory device to efficiently ensure that data returned from memory is accurate without appreciably increasing latency or reducing bandwidth. In some cases, the techniques for a read data path may be particularly advantageous in applications that involve high-density memory, for example, those that relate to the CXL standard. However, the techniques for a read data path may ensure the reliability of data returned from memory generally without causing significant decreases in the speed of memory returns.

Example Operating Environments

FIG. 1 illustrates an example operating environment including an apparatus 102 that can implement a read data path. The apparatus 102 can include various types of electronic devices, including an internet-of-things (IoT) device 102-1, tablet device 102-2, smartphone 102-3, notebook computer 102-4, passenger vehicle 102-5, server computer 102-6, server cluster 102-7 that may be part of a cloud computing infrastructure, and data center or portion thereof (e.g., a PCB). Other examples of the apparatus 102 include a wearable device (e.g., a smartwatch or intelligent glasses), entertainment device (e.g., a set-top box, video dongle, smart television, a gaming device), desktop computer, motherboard, server blade, consumer appliance, vehicle, drone, industrial equipment, security device, sensor, or the electronic components thereof. Each type of apparatus can include one or more components to provide computing functionalities or features.

In example implementations, the apparatus 102 can include at least one host device 104, at least one interconnect 106, and at least one memory device 108. The host device 104 can include at least one processor 110, at least one cache memory 112, RAID logic 114, and a memory controller 116. The memory device 108, which can also be realized with a memory module, includes at least one memory 118, which can include, for example, a dynamic random-access memory (DRAM) die or module (e.g., Low-Power Double Data Rate synchronous DRAM (LPDDR SDRAM)). The DRAM die or module can include a three-dimensional (3D) stacked DRAM device, which may be a high-bandwidth memory (HBM) device or a hybrid memory cube (HMC) device. The memory device 108 can operate as a main memory for the apparatus 102. Although not illustrated, the apparatus 102 can also include storage memory. The storage memory can include, for example, a storage-class memory device (e.g., a flash memory, hard disk drive, solid-state drive, phase-change memory (PCM), or memory employing 3D XPoint™).

The processor 110 is operatively coupled to the cache memory 112, which is operatively coupled, either directly or indirectly through the RAID logic 114, to the memory controller 116. In other implementations, the cache memory 112, the RAID logic 114, or the memory controller 116 (including two or more of such components) may be incorporated into the memory device 108, such as in a CXL environment. Example CXL environments are described below with particular reference to FIG. 4. The processor 110 is also coupled, directly or indirectly, to the memory controller 116. The host device 104 may include other components to form, for instance, a system-on-a-chip (SoC). The processor 110 may include a general-purpose processor, central processing unit (CPU), graphics processing unit (GPU), neural network engine or accelerator, application-specific integrated circuit (ASIC), field-programmable gate array (FPGA) integrated circuit (IC), or communications processor (e.g., a modem or baseband processor).

In operation, the memory controller 116 can provide a high-level or logical interface between the processor 110 and at least one memory 118 (e.g., an external memory). The memory controller 116 may be realized with any of a variety of suitable memory controllers (e.g., a DDR memory controller that can process requests for data stored on the memory device 108). Although not shown, the host device 104 may include a physical interface (PHY) that transfers data between the memory controller 116 and the memory device 108 through the interconnect 106. For example, the physical interface may be an interface that is compatible with a DDR PHY Interface (DFI) Group interface protocol. The memory controller 116 can, for example, receive memory requests from the processor 110 and provide the memory requests to external memory with appropriate formatting, timing, and reordering. The memory controller 116 can also forward to the processor 110 responses to the memory requests received from external memory.

The RAID logic 114 may operatively couple the cache memory 112 or the processor 110 to the memory controller 116. The RAID logic 114 may perform a reliability check (e.g., error detection process) of data returned by the memory controller 116, for example, using metadata returned with the data. In instances where errors are detected by the RAID logic 114, a data recovery process may be implemented which enables the corrupted data to be recovered through logical combinations of other data stored at the memory device 108. Continuous data requests may be received at the RAID logic 114, and data processing of the data returned as a result of these requests may be performed in parallel to reduce the latency in memory returns from the memory device 108. This data processing may include subsequent data requests instantiated by the RAID logic 114 and transmitted to the memory device 108 to retrieve other data usable to recover corrupted data received from the memory device 108. The RAID logic 114 may perform logical operations on the other data retrieved from the memory device 108 to recover the corrupted data, which may then be stored in the cache memory 112. Details of the RAID logic 114 are described with respect to FIGS. 6 and 8.

The host device 104 is operatively coupled, via the interconnect 106, to the memory device 108. In some examples, the memory device 108 is connected to the host device 104 via the interconnect 106 with an intervening buffer or cache. The memory device 108 may operatively couple to storage memory (not shown). The host device 104 can also be coupled, directly or indirectly via the interconnect 106, to the memory device 108 and the storage memory. The interconnect 106 and other interconnects (not illustrated in FIG. 1) can transfer data between two or more components of the apparatus 102. Examples of the interconnect 106 include a bus, switching fabric, or one or more wires that carry voltage or current signals.

In some implementations, the interconnect 106 can include at least one command and address bus 120 (CA bus 120) and at least one data bus 122 (DQ bus 122). Each bus may be a unidirectional or a bidirectional bus. The CA bus 120 and the DQ bus 122 may couple to CA and DQ pins, respectively, of the memory device 108. The interconnect 106 may also include a chip-select (CS) I/O or line (not illustrated in FIG. 1) that can, for example, couple to one or more CS pins of the memory device 108. The interconnect 106 may further include a clock bus (CK bus—not illustrated in FIG. 1) that is part of or separate from the CA bus 120.

In other implementations, the interconnect 106 can be realized as a CXL link. In other words, the interconnect 106 can comport with at least one CXL standard or protocol. The CXL link can provide an interface on top of the physical layer and electricals of a PCIe 5.0 physical layer. The CXL link can cause requests to and responses from the memory device 108 to be packaged as flits. An example implementation of the apparatus 102 with a CXL link is discussed in greater detail with respect to FIG. 4. In at least some of the implementations of FIG. 4, the cache memory 112, the RAID logic 114, and the memory controller 116, in addition to the memory 118, can be included as part of the memory device 108. In still other implementations, the interconnect 106 can be another type of link, including a PCIe 5.0 link. In this document, some terminology may draw from one or more of these standards or versions thereof, like the CXL standard, for clarity. The described principles, however, are also applicable to memories and systems that comport with other standards and types of interconnects.

The illustrated components of the apparatus 102 represent an example architecture with a hierarchical memory system. A hierarchical memory system may include memories at different levels, with each level having memory with a different speed or capacity. As illustrated, the cache memory 112 logically couples the processor 110 to the memory device 108. In the illustrated implementation, the cache memory 112 is at a higher level than the memory device 108. A storage memory, in turn, can be at a lower level than the main memory (e.g., the memory device 108). Memory at lower hierarchical levels may have a decreased speed but increased capacity relative to memory at higher hierarchical levels.

The apparatus 102 can be implemented in various manners with more, fewer, or different components. For example, the host device 104 may include multiple cache memories (e.g., including multiple levels of cache memory) or no cache memory. In other implementations, the host device 104 may omit the processor 110 or the memory controller 116. A memory (e.g., the memory device 108) may have an "internal" or "local" cache memory. As another example, the apparatus 102 may include cache memory between the interconnect 106 and the memory device 108. Computer engineers can also include any of the illustrated components in distributed or shared memory systems.

Computer engineers may implement the host device 104 and the various memories in multiple manners. In some cases, the host device 104 and the memory device 108 can be disposed on, or physically supported by, a PCB (e.g., a rigid or flexible motherboard). The host device 104 and the memory device 108 may additionally be integrated together on an IC or fabricated on separate ICs and packaged together. The memory device 108 may also be coupled to multiple host devices 104 via one or more interconnects 106 and may respond to memory requests from two or more host devices 104. Each host device 104 may include a respective memory controller 116, or the multiple host devices 104 may share a memory controller 116. This document describes with reference to FIG. 2 an example computing system architecture having at least one host device 104 coupled to a memory device 108.

Two or more memory components (e.g., modules, dies, banks, or bank groups) can share the electrical paths or couplings of the interconnect 106. In some implementations, the CA bus 120 transmits addresses and commands from the memory controller 116 of the host device 104 to the memory device 108, which may exclude propagation of data. In some implementations, the memory device 108 may include multiple memory dice that couple to a common CA bus 120. The DQ bus 122 can propagate data between the memory controller 116 and the memory device 108. Like the CA bus 120, the DQ bus 122 may propagate data between multiple memory dice through a common DQ bus. The memory device 108 may also be implemented as any suitable memory including, but not limited to, DRAM, SDRAM, three-dimensional (3D) stacked DRAM, DDR memory, or LPDDR memory (e.g., LPDDR DRAM or LPDDR SDRAM).

The memory device 108 can form at least part of the main memory of the apparatus 102. The memory device 108 may, however, form at least part of a cache memory, a storage memory, or an SoC of the apparatus 102.

Figure 2:
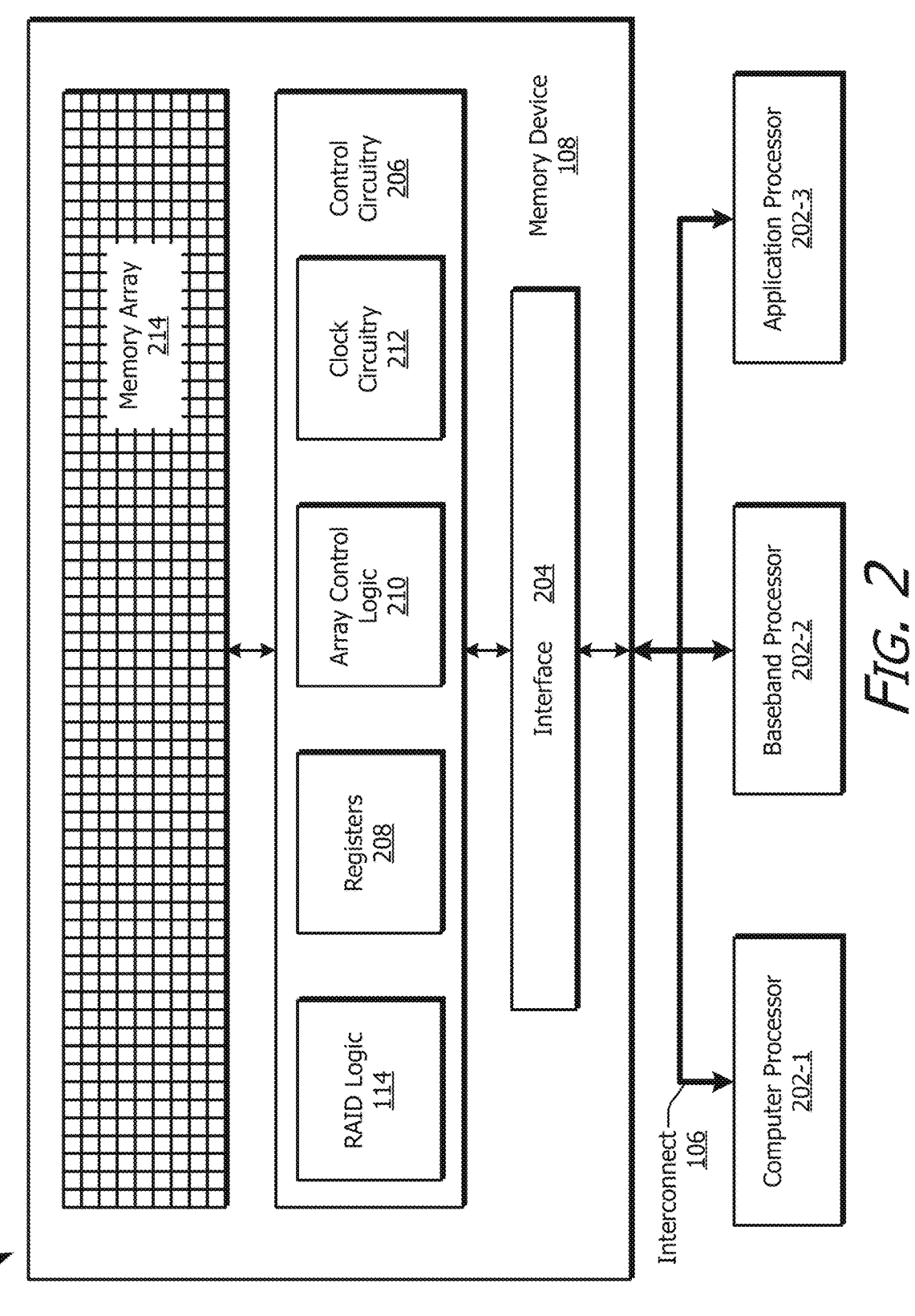
FIG. 2 illustrates an example computing system that can implement one or more aspects of a read data path.

FIG. 2 illustrates an example computing system 200 that can implement aspects of a read data path. In some implementations, the computing system 200 includes at least one memory device 108, at least one interconnect 106, and at least one processor 202.

The memory device 108 can include or be associated with at least one interface 204 and control circuitry 206, including RAID logic 114, registers 208, array control logic 210, and clock circuitry 212, operatively coupled to at least one memory array 214. The memory device 108 can correspond to one or more of the cache memory, the main memory, or a storage memory of the apparatus 102 of FIG. 1. Thus, the memory array 214 can include an array of memory cells, including but not limited to memory cells of DRAM, SDRAM, 3D-stacked DRAM, DDR memory, low-power DRAM, or LPDDR SDRAM. For example, the memory array 214 can include memory cells of SDRAM configured as a memory module with one channel containing either 16 or 8 data (DQ) signals, double-data-rate input/output (I/O) signaling, and supporting a supply voltage of 0.3 to 0.5V. The density of the memory device 108 can range, for instance, from 2 Gb to 32 Gb. The memory array 214 and the control circuitry 206 may be components on a single semiconductor die or on separate semiconductor dies. The memory array 214 or the control circuitry 206 may also be distributed across multiple dies.

The control circuitry 206 can include various components that the memory device 108 can use to perform various operations. These operations can include communicating with other devices, managing memory performance, performing refresh operations, and performing memory read or write operations. For example, the control circuitry 206 can include the RAID logic 114, one or more registers 208, at least one instance of array control logic 210, and clock circuitry 212. The RAID logic 114 can include logical circuitries that enable the memory device 108 to return data stored within one or more RAID stripes of the memory array 214. The RAID logic 114 can enable a data recovery process that utilizes RAID techniques to recover corrupted data. The registers 208 may be implemented, for example, as one or more registers that can store information to be used by the control circuitry 206 or another part of the memory device 108. The array control logic 210 can include circuitry that provides command decoding, address decoding, input/output functions, amplification circuitry, power supply management, power control modes, and other functions. The clock circuitry 212 can synchronize various memory components with one or more external clock signals provided over the interconnect 106, including a command/address clock or a data clock. The clock circuitry 212 can also use an internal clock signal to synchronize memory components.

The interface 204 can couple the control circuitry 206 or the memory array 214 directly or indirectly to the interconnect 106. As shown in FIG. 2, the RAID logic 114, the registers 208, the array control logic 210, and the clock circuitry 212 can be part of a single component (e.g., the control circuitry 206). In other implementations, the RAID logic 114, the one or more of the registers 208, the array control logic 210, or the clock circuitry 212 may be separate components on a single semiconductor die or distributed across multiple semiconductor dies. These components may individually or jointly couple to the interconnect 106 via the interface 204.

The interconnect 106 may use one or more of a variety of interconnects that communicatively couple together various components and enable commands, addresses, or other information and data to be transferred between two or more components (e.g., between the memory device 108 and the processor 218). Although the interconnect 106 is illustrated with a single line in FIG. 2, the interconnect 106 may include at least one bus, at least one switching fabric, one or more wires or traces that carry voltage or current signals, at least one switch, one or more buffers, and so forth. Further, the interconnect 106 may be separated into at least a CA bus 120 and a DQ bus 122 (as illustrated in FIG. 1). As discussed above with respect to FIG. 1, the interconnect 106 can include a CXL link or comport with at least one CXL standard and at least one common CA bus may couple to multiple memory dice. The CXL link can provide an interface or overlay on top of the physical layer and electricals of the PCIe 5.0 physical layer.

In some aspects, the memory device 108 may be a "separate" component relative to the host device 104 (of FIG. 1) or any of the processors 202. The separate components can include a PCB, memory card, memory stick, or memory module (e.g., a single in-line memory module (SIMM) or dual in-line memory module (DIMM)). Thus, separate physical components may be located together within the same housing of an electronic device or may be distributed over a server rack, a data center, and so forth. Alternatively, the memory device 108 may be integrated with other physical components, including the host device 104 or the processor 218, by being combined on a PCB or in a single package or an SoC.

The described apparatuses and methods may be appropriate for memory designed for lower-power operations or energy-efficient applications. An example of a memory standard related to low-power applications is the LPDDR standard for SDRAM as promulgated by the Joint Electron Device Engineering Council (JEDEC) Solid State Technology Association. In this document, some terminology may draw from one or more of these standards or versions thereof, like the LPDDR5 standard, for clarity. The described principles, however, are also applicable to memories that comport with other standards, including other LPDDR standards (e.g., earlier versions or future versions like LPDDR6) and to memories that do not adhere to a standard.

As shown in FIG. 2, the processors 202 may include a computer processor 202-1, a baseband processor 202-2, and an application processor 202-3, coupled to the memory device 108 through the interconnect 106. The processors 218 may include or form a part of a CPU, GPU, SoC, ASIC, or FPGA. In some cases, a single processor can comprise multiple processing resources, each dedicated to different functions (e.g., modem management, applications, graphics, central processing). In some implementations, the baseband processor 202-2 may include or be coupled to a modem (not illustrated in FIG. 2) and referred to as a modem processor. The modem or the baseband processor 202-2 may be coupled wirelessly to a network via, for example, cellular, Wi-Fi®, Bluetooth®, near field, or another technology or protocol for wireless communication.

In some implementations, the processors 202 may be connected directly to the memory device 108 (e.g., via the interconnect 106). In other implementations, one or more of the processors 202 may be indirectly connected to the memory device 108 (e.g., over a network connection or through one or more other devices). Further, the processor 218 may be realized as one that can communicate over a CXL-compatible interconnect. Accordingly, a respective processor 202 can include or be associated with a respective link controller, like the link controller 428 illustrated in FIG. 4. Alternatively, two or more processors 202 may access the memory device 108 using a shared link controller 428. In some of such cases, the memory device 108 may be implemented as a CXL-compatible memory device (e.g., as a CXL Type 3 memory expander) or another memory device that is compatible with a CXL protocol may also or instead be coupled to the interconnect 106.

Example Techniques and Hardware

Figure 3:
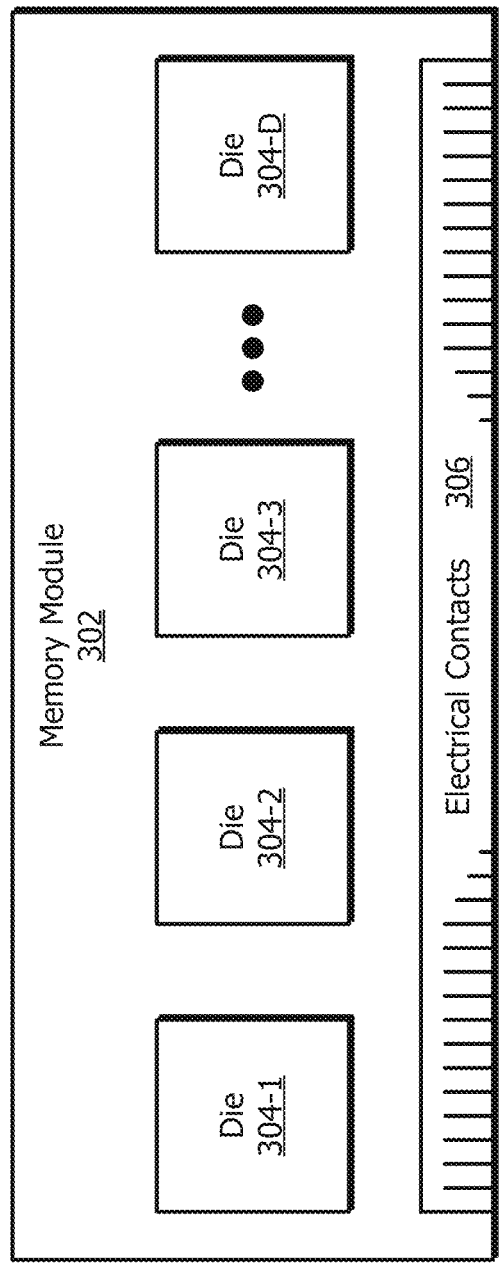
FIG. 3 illustrates an example memory device in which a read data path may be implemented.

FIG. 3 illustrates an example memory device. An example memory module 302 includes multiple dice 304. As illustrated, the memory module 302 includes a first die 304-1, a second die 304-2, a third die 304-3, and a Dth die 304-D, with "D" representing a positive integer. As a few examples, the memory module 302 can be a SIMM or a DIMM. As another example, the memory module 302 can interface with other components via a bus interconnect (e.g., a Peripheral Component Interconnect Express (PCIe®) bus). The memory device 108 illustrated in FIGS. 1 and 2 can correspond, for example, to multiple dies (or dice) 304-1 through 304-D or a memory module 302 with one or more dice 304. As shown, the memory module 302 can include one or more electrical contacts 306 (e.g., pins) to interface the memory module 302 to other components.

The memory module 302 can be implemented in various manners. For example, the memory module 302 may include a PCB, and the multiple dice 304-1 through 304-D may be mounted or otherwise attached to the PCB. The dice 304 (e.g., memory dice) may be arranged in a line or along two or more dimensions (e.g., forming a grid or array). The dice 304 may have a similar size or may have different sizes. Each die 304 may be similar to another die 304 or different in size, shape, data capacity, or control circuitries. The dice 304 may also be positioned on a single side or on multiple sides of the memory module 302. In some cases, the memory module 302 may be part of a CXL memory system or module.

In aspects, the dice 304 may be implemented such that multiple dice couple to a single CA bus. For example, the dice 304 may be configured such that each CA bus couples to four memory dice. In some implementations, the CA bus may communicate signals to a first die of the four memory dice that is linked, either directly or indirectly, to the other three memory dice. The four memory dice that couple to a common CA bus may communicate data along multiple shared DQ buses. For example, a first memory die and a second memory die of the four memory dice may couple to a first DQ bus, and the third memory die and the fourth memory die may couple to a second DQ bus. In this way, the memory module 302 may be implemented as a high-density memory module, which may be required for various standards, such as the LPDDR5 standard or the CXL standard.

Figure 4:
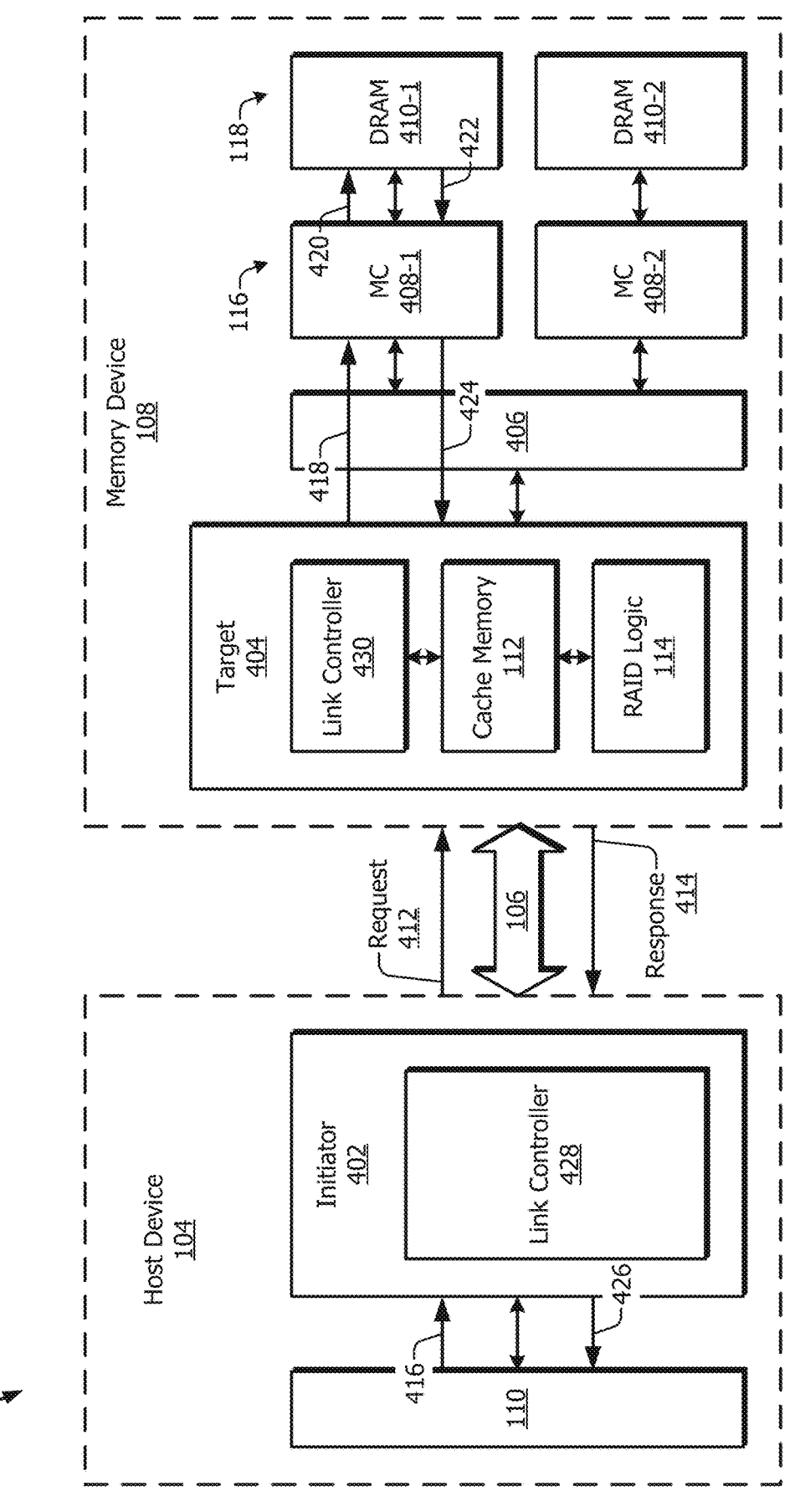
FIG. 4 illustrates an example of a system that includes a host device and a memory device coupled together via an interconnect in which a read data path may be implemented.

FIG. 4 illustrates an example of a system 400 that includes a host device 104 and a memory device 108 that are coupled together via an interconnect 106. The system 400 may form at least part of an apparatus 102 as shown in FIG. 1. As illustrated, the host device 104 includes a processor 110 and a link controller 428, which can be realized with at least one initiator 402. Thus, the initiator 402 can be coupled to the processor 110 or to the interconnect 106 (including to both), and the initiator 402 can be coupled between the processor 110 and the interconnect 106. Examples of initiators 402 may include a leader, a primary, a master, a main component, and so forth.

In the illustrated example system 400, the memory device 108 includes a link controller 430, which may be realized with at least one target 404. The target 404 can be coupled to the interconnect 106. Thus, the target 404 and the initiator 402 can be coupled to each other via the interconnect 106. Examples of targets 404 may include a follower, a secondary, a slave, a responding component, and so forth. The illustrated memory device 108 also includes at least one memory 118, which may be realized with at least one memory module or other component, such as a DRAM 410, as is described further below. The illustrated memory device 108 further includes at least one memory controller 116, which can be coupled between the target 404 and the memory 118. Examples of the memory controller 116 are described below.

In example implementations, the initiator 402 includes the link controller 428, and the target 404 includes the link controller 430. The link controller 428 or the link controller 430 can instigate, coordinate, cause, or otherwise control signaling across a physical or logical link realized by the interconnect 106 in accordance with one or more protocols. The link controller 428 may be coupled to the interconnect 106. The link controller 430 may also be coupled to the interconnect 106. Thus, the link controller 428 can be coupled to the link controller 430 via the interconnect 106. Each link controller 428 or 430 may, for instance, control communications over the interconnect 106 at a link layer or at one or more other layers of a given protocol. Communication signaling may include, for example, a request 412 (e.g., a write request or a read request), a response 414 (e.g., a write response or a read response), and so forth. As described herein, the link controller 430 can be implemented to provide a CXL protocol interface.

The target 404 may additionally or alternatively include at least one cache memory 112 and at least one instance of RAID logic 114. The cache memory 112 can store data for relatively faster accessing by the host device 104 as compared to the memory 118. The RAID logic 114 can control communication signaling to and from at least one memory controller 116 to, for example, overlay RAID striping on the memory 118. Although the cache memory 112 and the RAID logic 114 are illustrated as being implemented within the target 404, the cache memory 112 or the RAID logic 114 (including both in some cases) may be implemented at any other location between the link controller 430 and the at least one memory controller 116. As shown, the at least one memory controller 116 can be realized as one or more memory controllers 408-1 and 408-2. The RAID logic 114 may transmit signaling to at least one memory controller 408. For example, the RAID logic 114 may transmit signaling indicative of the request 412 to the appropriate memory controller (e.g., MC 408-1 or MC 408-2) of the at least one memory controller 408 based on the location of the data that is requested (e.g., within the DRAM 410-1 or 410-2).

The memory device 108 may further include at least one interconnect 406, which is coupled between at least one memory controller 408 (e.g., MC 408-1 and MC 408-2) and the target 404, such as the RAID logic 114. Although not shown in FIG. 4, another interconnect can be coupled between the at least one memory controller 408 and the memory 118. The memory 118 can be realized with one or more instances of DRAM 410-1 and 410-2. Within the memory device 108, and relative to the target 404, the interconnect 406, the memory controller 408, or the DRAM 410 (or other memory component) may be referred to as a "backend" component of the memory device 108. Similarly, relative to the link controller 430, the cache memory 112 and the RAID logic 114 may also be considered "backend" components. In some cases, the interconnect 406 is internal to the memory device 108 and may operate in a manner the same as or different from the interconnect 106.

As shown, the memory device 108 may include multiple memory controllers 408-1 and 408-2 or multiple DRAMs 410-1 and 410-2. Although two each are shown, the memory device 108 may include one or more memory controllers or one or more DRAMs. For example, a memory device 108 may include four memory controllers and 16 DRAMs, such that four DRAMs are coupled to each memory controller. The memory components of the memory device 108 are depicted as DRAM only as an example, for one or more of the memory components may be implemented as another type of memory. For instance, the memory components may include nonvolatile memory like flash or PCM. Alternatively, the memory components may include other types of volatile memory like static random-access memory (SRAM). A memory device 108 may also include any combination of memory types.

In some cases, the memory device 108 may include the target 404, the interconnect 406, the at least one memory controller 408, and the at least one DRAM 410 within a single housing or other enclosure. The enclosure, however, may be omitted or may be merged with an enclosure for the host device 104, the system 400, or an apparatus 102 (of FIG. 1). The interconnect 406 can be disposed on a PCB. Each of the target 404, the memory controller 408, and the DRAM 410 may be fabricated on at least one IC and packaged together or separately. The packaged ICs may be secured to or otherwise supported by the PCB and may be directly or indirectly coupled to the interconnect 406. In other cases, the target 404, the interconnect 406, and the one or more memory controllers 408 may be integrated together into one IC. In some of such cases, this IC may be coupled to a PCB, and one or more modules for the memory components (e.g., for the DRAM 410) may also be coupled to the same PCB, which can form a CXL type of memory device 108. This memory device 108 may be enclosed within a housing or may include such a housing. The components of the memory device 108 may, however, be fabricated, packaged, combined, and/or housed in other manners.

As illustrated in FIG. 4, the target 404, including the link controller 430 and the RAID logic 114 thereof, can be coupled to the interconnect 406. Each memory controller 408 of the multiple memory controllers 408-1 and 408-2 can also be coupled to the interconnect 406. Accordingly, the target 404 and each memory controller 408 of the multiple memory controllers 408-1 and 408-2 can communicate with each other via the interconnect 406. Each memory controller 408 is coupled to at least one DRAM 410. As shown, each respective memory controller 408 of the multiple memory controllers 408-1 and 408-2 is coupled to at least one respective DRAM 410 of the multiple DRAMs 410-1 and 410-2. Each memory controller 408 of the multiple memory controllers 408-1 and 408-2 may, however, be coupled to a respective set of multiple DRAMs 410 (e.g., five DRAMs 410) or other memory components. As shown by way of example with respect to the DRAM 410-2, each DRAM 410 may include at least one memory 118 (e.g., also of FIG. 1), including at least one instance of both such components.

Each memory controller 408 can access at least one DRAM 410 by implementing one or more memory access protocols to facilitate reading or writing data based on at least one memory address. The memory controller 408 can increase bandwidth or reduce latency for the memory accessing based on the memory type or organization of the memory components, like the DRAMs 410. The multiple memory controllers 408-1 and 408-2 and the multiple DRAMs 410-1 and 410-2 can be organized in many different manners. For example, each memory controller 408 can realize one or more memory channels for accessing the DRAMs 410. Further, the DRAMs 410 can be manufactured to include one or more ranks, such as a single-rank or a dual-rank memory module. Each DRAM 410 (e.g., at least one DRAM IC chip) may also include multiple banks, such as 8 or 16 banks.

This document now describes examples of the host device 104 accessing the memory device 108. The examples are described in terms of a general access which may include a memory read access (e.g., a retrieval operation) or a memory write access (e.g., a storage operation). The processor 110 can provide a memory access request 416 to the initiator 402. The memory access request 416 may be propagated over a bus or other interconnect that is internal to the host device 104. This memory access request 416 may be or may include a read request or a write request. The initiator 402, such as the link controller 428 thereof, can reformulate the memory access request into a format that is suitable for the interconnect 106. This formulation may be performed based on a physical protocol or a logical protocol (including both) applicable to the interconnect 106. Examples of such protocols are described below.

The initiator 402 can thus prepare a request 412 and transmit the request 412 over the interconnect 106 to the target 404. The target 404 receives the request 412 from the initiator 402 via the interconnect 106. The target 404, including the link controller 430 and the RAID logic 114 thereof, can process the request 412 to determine (e.g., extract or decode) the memory access request. Based on the determined memory access request, the target 404 can forward a memory request 418 over the interconnect 406 to a memory controller 408, which is the first memory controller 408-1 in this example. For other memory accesses, the targeted data may be accessed with the second DRAM 410-2 through the second memory controller 408-2.

The first memory controller 408-1 can prepare a memory command 420 based on the memory request 418. The first memory controller 408-1 can provide the memory command 420 to the first DRAM 410-1 over an interface or interconnect appropriate for the type of DRAM or other memory component. The first DRAM 410-1 receives the memory command 420 from the first memory controller 408-1 and can perform the corresponding memory operation. The memory command 420, and corresponding memory operation, may pertain to a read operation, a write operation, a refresh operation, and so forth. Based on the results of the memory operation, the first DRAM 410-1 can generate a memory response 422. If the memory request 412 is for a read operation, the memory response 422 can include the requested data. If the memory request 412 is for a write operation, the memory response 422 can include an acknowledgment that the write operation was performed successfully. The first DRAM 410-1 can return the memory response 422 to the first memory controller 408-1.

The first memory controller 408-1 receives the memory response 422 from the first DRAM 410-1. Based on the memory response 422, the first memory controller 408-1 can prepare a memory response 424 and transmit the memory response 424 to the target 404 via the interconnect 406. The target 404 receives the memory response 424 from the first memory controller 408-1 via the interconnect 406. Based on this memory response 424, and responsive to the corresponding request 412, the target 404 can formulate a response 414 for the requested memory operation. The response 414 can include read data or a write acknowledgment and be formulated in accordance with one or more protocols of the interconnect 106.

The memory response 424 may be received by the RAID logic 114 where a reliability check is performed to determine whether the memory response 424 includes an error. For instance, if the request 412 is a read operation, the RAID logic 114 may determine if the returned data includes an error. If the data is determined not to include an error, it may be formulated as the response 414. If, however, the data is determined to include an error, the RAID logic 114 may transmit additional memory requests to obtain other data that may be usable to recover the data that includes the error (e.g., corrupted data). For example, the RAID logic 114 may transmit a memory request to the memory controller 408-2 (e.g., using the interconnect 406) that is effective to retrieve other data (e.g., of the DRAM 410-2) within a same RAID stripe (e.g., that spans the DRAM 410-1 and the DRAM 410-2) as the corrupted data. This other data may be returned as a memory response to the RAID logic 114 where one or more logical operations are performed to recover the corrupted data. The recovered data may then be formulated into the response 414.

To respond to the memory request 412 from the host device 104, the target 404 can transmit the response 414 to the initiator 402 over the interconnect 106. Thus, the initiator 402 receives the response 414 from the target 404 via the interconnect 106. The initiator 402 can therefore respond to the "originating" memory access request 416, which is from the processor 110 in this example. To do so, the initiator 402 prepares a memory access response 426 using the information from the response 414 and provides the memory access response 426 to the processor 110. In this way, the host device 104 can obtain memory access services from the memory device 108 using the interconnect 106. Example aspects of an interconnect 106 are described next.

The interconnect 106 can be implemented in a myriad of manners to enable memory-related communications to be exchanged between the initiator 402 and the target 404. Generally, the interconnect 106 can carry memory-related information, such as data or a memory address, between the initiator 402 and the target 404. In some cases, the initiator 402 or the target 404 (including both) can prepare memory-related information for communication across the interconnect 106 by encapsulating such information. The memory-related information can be encapsulated into, for example, at least one packet (e.g., a flit). One or more packets may include headers with information indicating or describing the content of each packet.

In example implementations, the interconnect 106 can support, enforce, or enable memory coherency for a shared memory system, for a cache memory, for combinations thereof, and so forth. Additionally or alternatively, the interconnect 106 can be operated based on a credit allocation system. Possession of a credit can enable an entity, such as the initiator 402, to transmit another memory request 412 to the target 404. The target 404 may return credits to "refill" a credit balance at the initiator 402. A credit-based communication scheme across the interconnect 106 may be implemented by credit logic of the target 404 or by credit logic of the initiator 402 (including by both working together in tandem). Examples of read data paths are described herein with reference to at least one memory controller 408 and at least one DRAM 410. Example aspects of the memory controller 408 and the DRAM 410 are described below with reference to FIGS. 5 through 11.

The system 400, the initiator 402 of the host device 104, or the target 404 of the memory device 108 may operate or interface with the interconnect 106 in accordance with one or more physical or logical protocols. For example, the interconnect 106 may be built in accordance with a Peripheral Component Interconnect Express (PCIe or PCI-e) standard. Applicable versions of the PCIe standard may include 1. x, 2. x, 3. x, 4.0, 5.0, 6.0, and future or alternative versions. In some cases, at least one other standard is layered over the physical-oriented PCIe standard. For example, the initiator 402 or the target 404 can communicate over the interconnect 106 in accordance with a CXL standard. Applicable versions of the CXL standard may include 1. x, 2.0, and future or alternative versions. The CXL standard may operate based on credits, such as read credits and write credits. In such implementations, the link controller 428 and the link controller 430 can be CXL controllers.

Figure 5:
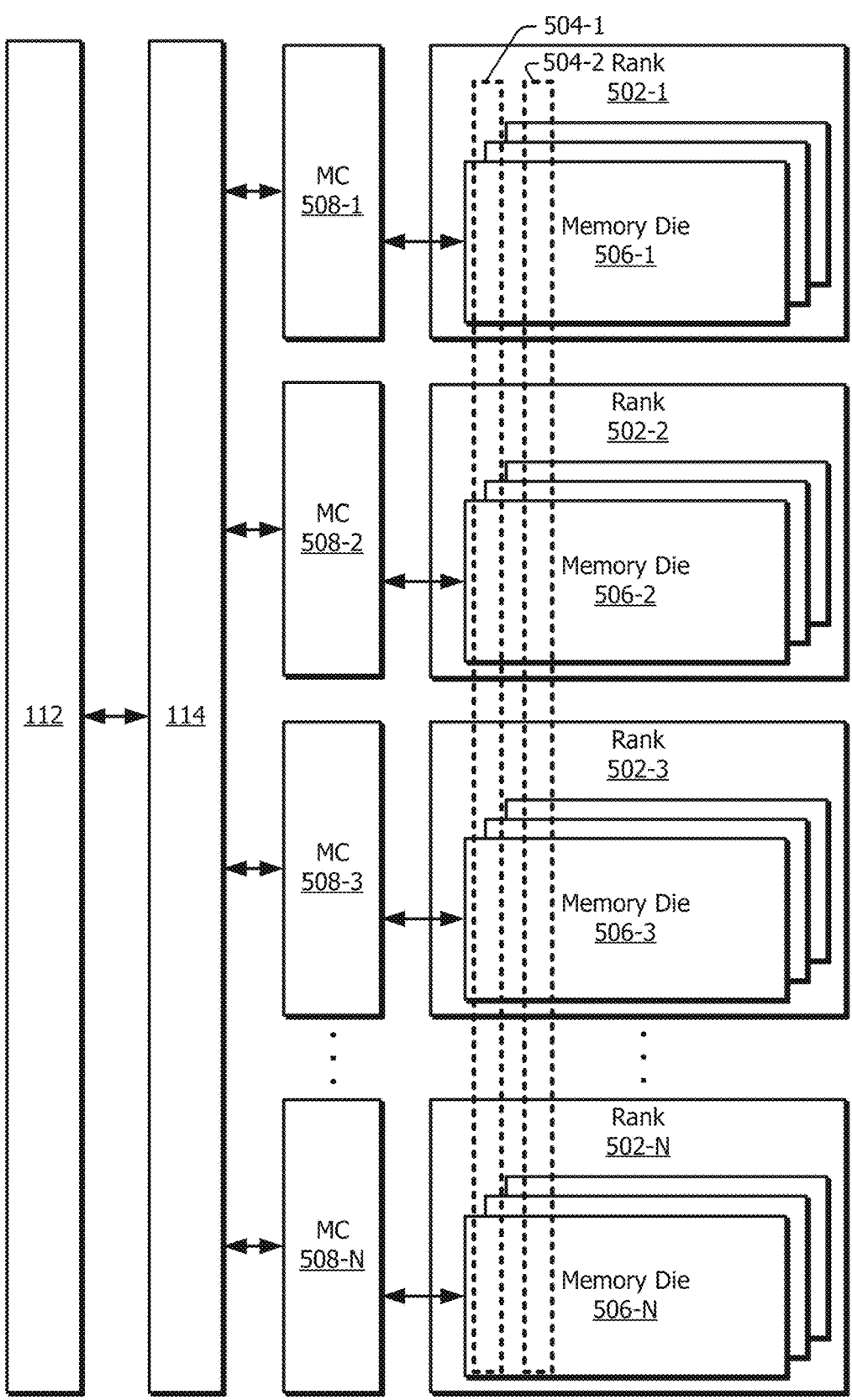
FIG. 5 illustrates an example memory architecture of a system in which a read data path may be implemented.

FIG. 5 illustrates an example memory architecture of a system in which a read data path may be implemented. As illustrated, the system includes at least one memory rank 502. Each memory rank may include one or more memory dice 506, which may be implemented as part of a memory device (e.g., the memory device 108 of FIG. 1, 2, or 4 and/or including at least a portion of the memory module 302 of FIG. 3). The memory device may include any number of memory dice, as described with respect to FIG. 3. As illustrated, the memory dice 506 can be coupled to a memory controller 508, for instance, via an interconnect or using an interface. The memory controller 508 can correspond to the host-side memory controller 116 (of FIG. 1) or to the memory-side memory controller 408 (of FIG. 4). In this way, the RAID logic 114 may be implemented within the host device 104 (of FIG. 1) or the memory device 108 (of FIG. 1). The memory controller 508 may initiate or control operations of the memory dice 506, such as read or write operations.

As illustrated, the system includes memory rank 502-1, memory rank 502-2, memory rank 502-3, and memory rank 502-N, where "N" represents a positive integer. Each memory rank 502 is illustrated with a corresponding set of one or more memory dice 506 (e.g., memory dice 506-1, memory dice 506-2, memory dice 506-3, memory dice 506-N) and a memory controller 508 (e.g., memory controller 508-1, memory controller 508-2, memory controller 508-3, memory controller 508-N) Each memory rank may include a number "N" of memory dice that is the same as or different from any of the other memory ranks. The positive integer number "N" of memory dice per rank may differ from the number "N" of memory ranks. Moreover, any of the memory controllers 508 may couple to one or more of the memory ranks 502. As illustrated, each memory rank 502 has a separate or respective memory controller 508 responsible for controlling the memory operations of that rank.

The memory device may be configured such that data is stored in accordance with a RAID architecture, for instance, as RAID stripes 504 across the one or more memory ranks 502. The memory dice 506 may be organized in pages with M RAID stripes (e.g., RAID stripe 504-1 and RAID stripe 504-2) per page of memory, where "M" is a positive integer. Each RAID stripe 504 may store a particular amount of data (e.g., as a multiple of a word length of the CPU or multiple bytes) and metadata therewith. One of the memory ranks 502 may store parity data, which may be usable to recover corrupted data in a RAID stripe 504 based on a logical combination of the parity data with the remaining data in the RAID stripe 504. For example, if data retrieved from memory rank 502-1 is corrupted, retrieving data from memory ranks 502-2 through 502-N and performing one or more logical operations (e.g., as defined by the RAID logic 114) on the retrieved data in conjunction with the parity data may enable the uncorrupted data to be recovered. Each RAID stripe 504 may utilize at least one memory rank (e.g., memory rank 502-N) to maintain parity data for recovery of corrupted data within the RAID stripe 504. This memory rank may be the same or different across different RAID stripes 504. More generally, one or more memory ranks may be used to store redundancy data (e.g., parity or correction data) for a given RAID stripe 504.

As a specific example, each RAID stripe 504 may have a width of sixty-four bytes plus accompanying metadata that may provide information (e.g., to enable a reliability check) about the data. Thus, the data stored within each RAID stripe 504 may be sixty-four bytes plus the accompanying metadata multiplied by the number of memory ranks storing the RAID stripe 504, not including the parity data. The parity data may not store data to be retrieved by, for instance, a CPU or other requestor, but it is instead data usable to recover corrupted data within a particular RAID stripe 504.

As described above, the memory device may be implemented as a hierarchical memory, with each level of memory having a varying level of speed or capacity. As illustrated, the cache memory 112 is located at a higher hierarchical level than the memory dice 506. When a processor needs data to perform a task, the processor may request the data from the cache memory 112. If the data is present within the cache memory 112 (e.g., a cache hit), the data will be returned to the processor without needing to be retrieved from lower-level memory. In the event of a cache miss, however, the cache memory 112 may request the required data from lower-level memory (e.g., the memory composed of the memory ranks 502). The cache memory 112 may request the data as a full cache line, which may be the same as or a different size from the memory devices' data width.

If the requested data is less than the size of the cache line, for example, the cache line is generally set to be some multiple of the amount of requested data. Thus, in at least some of such cases, the cache memory 112 can request from the memory a cache line replacement that includes the requested data as well other data to completely fill the cache line. The requested data may be located anywhere along the cache line. For instance, the cache memory 112 may request a cache line of data beginning at the address of the first requested data or beginning at an address before that of the first requested data. By way of example only, the requested data may include 64 bytes, and the cache line may include 256 bytes. The cache line therefore contains 4 portions of "requestable" data that have 64 bytes apiece in this example. The requested data can occupy any one of the four portions (e.g., first, second, third or fourth slot) forming the cache line, depending on the address of the requested data. In the event that the cache line is larger than the data bus width (e.g., a cache line length of 128 or 256 bytes), the cache line may be read from memory as multiple read requests, which may span multiple ranks or one or more RAID stripes (e.g., RAID stripe 504-1 and RAID stripe 504-2).

With continuing reference to FIG. 5, the cache line read is transmitted to the RAID logic 114, which transmits read requests to the memory controller 508-1. The read requests are transmitted as two read requests, a first read request of memory in the RAID stripe 504-1 and a second request of memory in the RAID stripe 504-2. The second request may be transmitted subsequent to the first request, and the memory controller 508-1 may handle the read requests in the order received. The first read request may be directed to a particular memory controller based on the location of the required data within the memory ranks 502. If the data is located in a particular memory rank (e.g., memory rank 502-1) with an associated memory controller (e.g., memory controller 508-1), the memory controller may receive a read request, transmit that read request to the associated memory dice (e.g., 506-1), and the data may be returned to the memory controller. The data may be transmitted to the RAID logic 114, where a reliability check is performed using the metadata accompanying the data. If the data is accurate, it may be stored within the cache memory 112. If an error is detected within the data, however, the RAID logic 114 may transmit read requests to at least some of the other memory controllers (e.g., memory controllers 508-2 through 508-N) to retrieve the other data from the RAID stripe 504-1 to recover the corrupted data. This data may be provided to the RAID logic 114 where logic operations are performed to recover the corrupted data.

Prior, during, or after the recovery of the data associated with the first read request, the RAID logic 114 may transmit a request for data associated with the second read request. This data may be located within a same memory rank as the data associated with the first read request. The data may be returned to the memory controller and provided to the RAID logic 114 along with the metadata. The RAID logic 114 may perform the reliability check on the second data and determine the accuracy of the second data. This data may be passed to cache memory 112 if the data passes the reliability check, or additional read requests may be transmitted to the memory to recover corrupted data based on the detection of an error within the data. In some instances, the RAID logic 114 may include parallel logic paths that may handle subsequent read requests and data recovery in parallel to reduce the latency and increase the bandwidth of the memory device.

Once the data has been retrieved from the memory, and the accuracy of the data has been ensured, the data may be stored in the cache memory 112. The processor may access the cache memory 112 to retrieve the data and provide functionality to a computing device. The data may be stored in the cache memory 112 until another cache miss is detected and memory resources within the cache are needed to store data associated with a new memory request. In some of the example implementations described above, a read request is realized (e.g., transmitted) as two read requests to the memory dice. In other implementations, however, a read request can be realized (e.g., transmitted) as one read request depending on the stripe geometry arrangement along the memory dice and depending on the size of the cache line.

Figure 6:
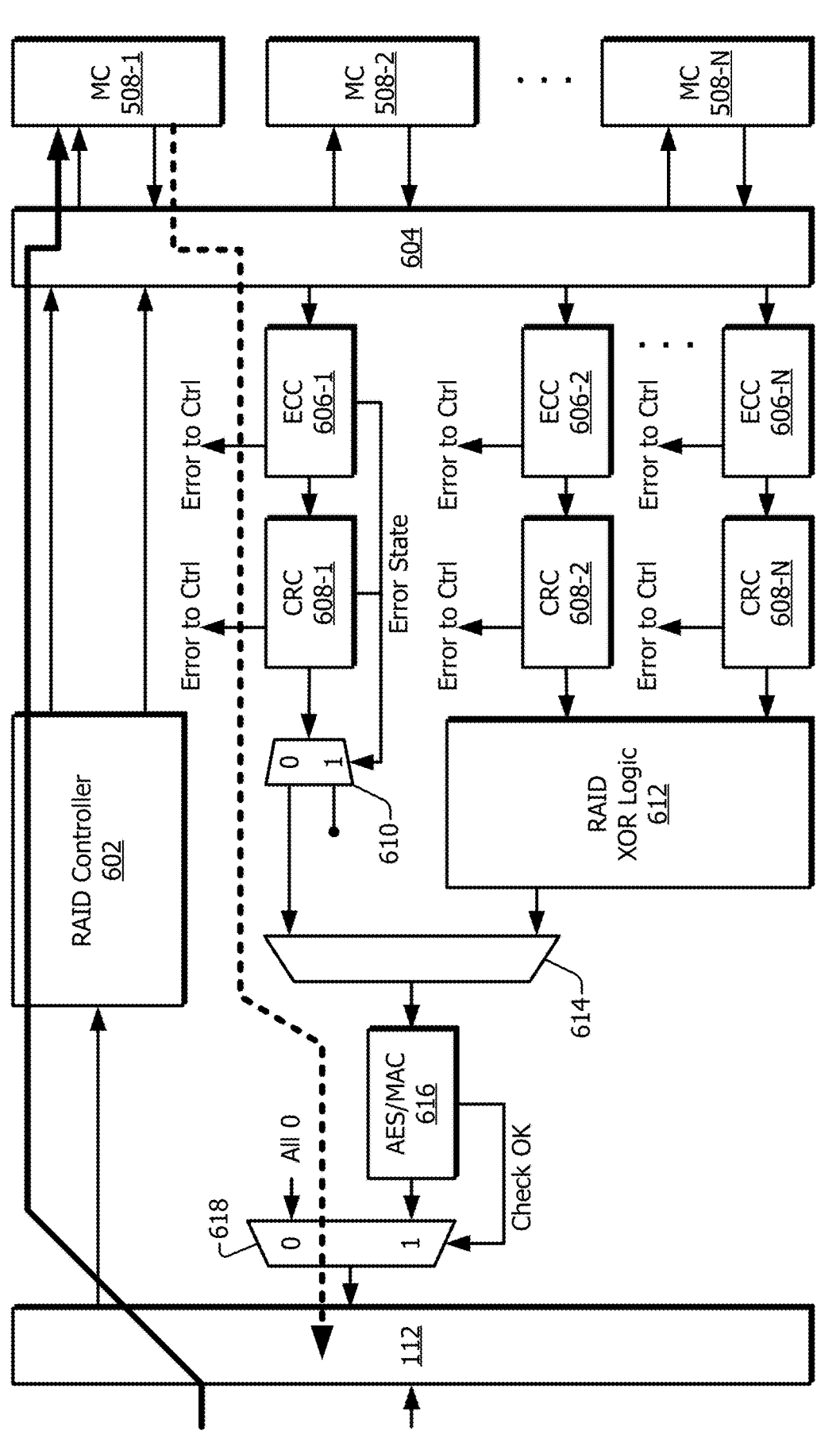
FIG. 6 illustrates an example system, including logic capable of implementing a read data path, performing a read operation that does not include errors.

FIG. 6 illustrates an example system, including logic capable of implementing a read data path, performing a read operation that does not include errors. The logic may be an example of the RAID logic 114 (of FIG. 1). As illustrated, the logic includes a RAID controller 602, an interconnect 604, an error correction code block 606 (ECC 606), a cyclic redundancy check block 608 (CRC 608), a multiplexer 610 (MUX 610), RAID XOR logic 612, an arbiter 614, an advanced encryption standard block and message authentication code block 616 (AES/MAC 616), and the MUX 618. Requests are indicated as solid lines and returns are indicated as dotted lines.

The RAID controller 602 may be responsible for controlling read requests to one or more of the memory controllers 508. Particularly, the RAID controller 602 may transmit read requests to the memory controllers 508 via the interconnect 604 to enable the memory controller 508 to retrieve data from the memory (not shown). The RAID controller 602 may parse a cache line read request into multiple read commands based on the stripe geometry arrangement along the memory device and the cache line size. The memory requests may be forwarded in accordance with an internal or external clock of any component of the memory device or host device. The RAID controller 602 may be notified if an error is detected within the data returned from memory. If an error is detected, the RAID controller 602 may transmit signaling indicative of read requests to other memory controllers holding the other data within a particular RAID stripe in which the corrupted data is stored. The RAID controller 602 may manage read requests resulting from requests from the cache memory 112 and from errors in data returned from memory.

The logic may include reliability check circuitry, which may include the ECC 606, the CRC 608, or the AES/MAC 616. The reliability check circuitry may utilize metadata returned with the data to ensure the accuracy of the data returned from memory. If an error is detected within the data, the reliability check circuitry may transmit signaling indicative of the error (e.g., an error state) to the RAID controller 602. Data determined to be corrupted with an error may be discarded (e.g., error state "1" on the MUX 610), but data that is not determined to be corrupted with an error may be provided to the cache memory 112 (e.g., no error state "0" on the MUX 610). The logic may include multiple copies of the reliability check circuitry, for example, a same number of copies or instances as memory controllers 508 (e.g., N copies), to enable the logic to perform the reliability check in parallel with respect to the multiple memory controllers 508. In some instances, this may enable the logic to perform operations related to recovery of corrupted data during the processing of subsequent read requests.

The reliability check circuitry may include one or more of the ECC 606, the CRC 608, and the AES/MAC 616. The ECC 606 may be utilized to detect or correct errors within data received from memory based on redundant information provided by the metadata. In some instances, the ECC 606 may be able to correct an error detected. In this case, the ECC 606 may choose not to transmit an indication of the error to the RAID controller 602, while in other instances, the ECC 606 may transmit an indication of the error to the RAID controller 602. By not transmitting the error, the ECC 606 may be able to recover the corrupted data without requiring additional reads to memory. If the ECC 606 is unable to correct the detected error, the RAID controller 602 may be alerted of the error, and the data recovery process may begin.

The reliability check circuitry may additionally or alternatively include the CRC 608. At the CRC 608, the value of the data may be hashed to determine a representation of the data received from memory. This hash of the data may be compared to a checksum or similar to determine whether an error has occurred within the data. The checksum may be determined from metadata retrieved from memory alongside the data. If the hash of the data does not match the checksum, an error may be detected, and an indication of the error may be transmitted to the RAID controller 602. In response to the error, the RAID controller 602 may begin the data recovery process using, for instance, one or more RAID techniques.

In addition, or as an alternative to the ECC 606 or the CRC 608, the reliability check circuitry may include the AES/MAC 616. The AES/MAC 616 may enable several security functions associated with the data received from memory. An AES unit may provide encryption and decryption functionalities, such as by using one or more protocols and/or varying key sizes, like 128b, 192b, or 256b. The AES unit can perform encryption or decryption of data that arrives in, e.g., 16-byte quantities to be encrypted or decrypted using different block cipher modes of operation. Encryption or decryption may occur based on metadata provided with the data received from memory. The metadata may provide an indication of key pairings or other cryptographic information that may be used to encrypt or decrypt the data. If the AES unit fails to encrypt or decrypt the data using the metadata, an error may be detected and indicated to the RAID controller 602 to reduce exposure from potentially untrusted activity.

A MAC engine may utilize, for instance, a secure hash algorithm (SHA) SHA-256 as a hashing algorithm. SHA-256 is a member of the SHA-2 family of hashing algorithms in which the digest (or hash output) is of 256b length, regardless of the data size of the input to be hashed. MAC may operate as a message authentication protocol layered on top of a hashing function (e.g., SHA-256), which mixes in a secret key for cryptographic purposes. MAC may operate as a particular application of appending the secret key in a prescribed manner, such as twice, around the hashing (via SHA-256) of the message. To provide this functionality, a 256b key may be programmed into the circuit component before the message hash begins. The timing of authentication completion can vary and may be longer in latency than using native SHA-256. The MAC engine may utilize the metadata to execute the hashing algorithm or to compare the hash to an expected value. The metadata may include a private key or signature that may be used to authenticate the data. If the data cannot be authenticated by the MAC engine, the RAID controller 602 may receive the indication of the error and begin the data recovery process.

If an error is detected by the AES/MAC 616, the data may be discarded (e.g., error state "0" on the MUX 618). In aspects, data indicative of the error, for instance, zeros and poison, may be sent to the cache memory 112 when an error is detected. If no error is detected, the AES/MAC 616 may transmit signaling indicative that the data has successfully been authenticated/decrypted, and the data may be stored in the cache memory 112 (e.g., error state "1" on the MUX 618). In doing so, the likelihood of success of possible malicious activity within the memory device may be reduced.

When the RAID controller 602 receives an error from the reliability check circuitry, a process to read other data from the RAID stripe and recover the corrupted data may begin. RAID techniques may utilize parity data (or, more generally, redundancy data) that, when combined with the other data from a RAID stripe, may reproduce the intended data. The RAID XOR logic 612 may be utilized to perform the one or more relevant logical operations to combine the data from the RAID stripe to recover the corrupted data in a recovered or uncorrupted form. The RAID XOR logic 612 may include any number of logical operators effective to perform operations with the data received from memory as inputs. As a result, the RAID XOR logic 612 may output a recovered version of the corrupted data that does not include the detected error.

In some implementations, the logic may include multiple copies of the reliability check circuitry (e.g., as shown, N copies). The logic may include a logical path for data received from memory that does not contain an error and a separate logical path for recovery of corrupted data. As shown, ECC 606-1, CRC 608-1, and the MUX 610 form at least part of the no-error logical data path. In contrast, ECC 606-2 through 606-N, CRC 608-2 through 608-N, and the RAID XOR logic 612 form at least part of the data recovery path. Example operations of the data recovery path are described further below with reference to FIG. 8. These logical paths may be implemented in parallel, enabling the logic to process data received for data recovery in parallel with subsequent requests received from the cache memory 112. Given that these paths may operate in parallel, an arbiter 614 may be needed to arbitrate between signals carried on each path. The arbiter 614 may determine an order in which the signals on each path are propagated.

FIG. 6 illustrates an example data path of a read request without errors. A cache miss occurs at the cache memory 112, and a cache line read request is transmitted as signaling to the RAID controller 602. The RAID controller 602 parses the cache line read request into two read requests to be transmitted sequentially. The RAID controller 602 transmits a first read request over the interconnect 604 and to the memory controller 508-1 that instructs the memory controller 508-1 to retrieve data from a particular address in memory. The memory controller 508-1 transmits signaling to the memory (not shown) to perform a read operation at the address and to return signaling indicative of the data and its associated metadata. The data and the metadata are then returned to the memory controller 508-1 and provided to the reliability check circuitry over the interconnect 604.

The data and the metadata are first passed through the ECC 606-1 where ECC bits of the metadata are consumed to detect or correct errors within the data. As illustrated, the ECC 606-1 detects no errors, or the errors are corrected, and the data continues to the CRC 608-1. Although described as consuming the metadata, the reliability check circuitry may utilize the metadata without consuming it. As such, metadata may not be removed from the data as it passes through the reliability check circuitry. At CRC 608-1, CRC bits of the metadata may be consumed to verify a checksum of the data. As illustrated, no errors are detected within the data, and the data is passed to the MUX 610. Given that no errors have been detected and no error-indicating signals have been generated, the MUX maintains a "0" error state and the data is passed to the arbiter 614. In this example, no signaling need be present along the data recovery path for the current memory request as no errors have been instantiated, so the data may continue through the arbiter 614. In other examples, however, the flow of data along the no-error data path may be arbitrated to determine a correct timing to propagate the signal indicative of the data past the arbiter 614.

The data and the remaining metadata (if any) then continue to the AES/MAC 616 where decryption and authentication can be performed. If encryption and authentication are successful, as illustrated, the AES/MAC 616 passes signaling that indicates that the data has undergone the reliability check without error and that the data is ready to be stored in the cache memory 112. This signaling results in a "1" state at the MUX 618, which enables the data to be stored in the cache memory 112.

Figure 7:
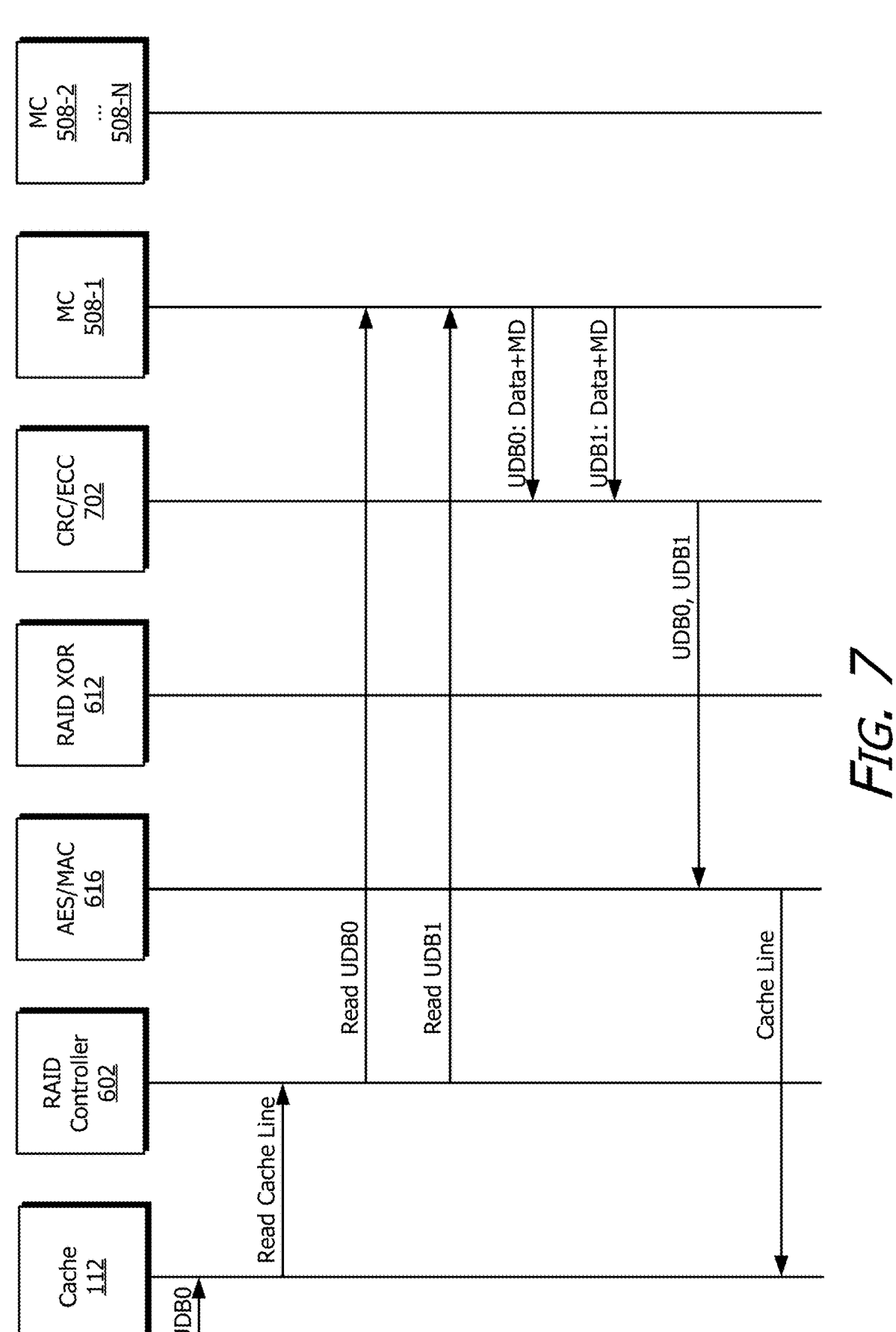
FIG. 7 illustrates an example sequence diagram of a system that is capable of implementing a read data path performing a read operation that does not include errors.

FIG. 7 illustrates an example sequence diagram of a system capable of implementing a read data path performing a read operation that does not include errors. The cache memory 112 may receive a request for data. The data may be held within user data blocks (UDB) with sizes of, for example, eight, sixteen, thirty-two, or sixty-four bytes. The data blocks may be sized the same as or different from the amount of data held within a single RAID stripe on each bank. The data blocks may be a same size or different size as the length of the cache line. Responsive to receiving the signaling indicative of the request for data (e.g., UDB0), the cache memory 112 may determine whether that data is currently stored in the cache memory 112. If the data is stored in the cache memory 112 (e.g., a cache hit), signaling indicative of the data may be returned to the requestor. If the data is not stored in the cache memory 112 (e.g., a cache miss), the cache memory 112 may transmit, to the RAID controller 602 signaling indicative of a request to read a cache line including the requested data.

The RAID controller 602 may parse the cache line read request into read commands based on the bandwidth of the memory device or the size of the interconnect between memory controllers 508 and the memory. As illustrated, the cache line is twice the size of a bandwidth of the memory device, so the cache line request is parsed into two read requests (e.g., UDB0 and UDB1). The RAID controller 602 may transmit the read requests in sequential order. The data to be retrieved by the read requests may be located on the same or different memories. Signaling indicative of the read requests may be transmitted from the RAID controller 602 to the appropriate memory controller 508. As illustrated, UDB0 and UDB1 are located in a memory coupled to the memory controller 508-1, so the read request signaling is transmitted to the memory controller 508-1.

The memory controller 508-1 may transmit signaling indicative of a request for the data to the memory, which may result in the data being returned to the memory controller 508-1 alongside metadata that relates to the returned data. Once returned, the memory controller 508-1 may transmit signaling indicative of the data or the metadata to reliability check circuitry. The reliability check circuitry may include a CRC/ECC block 702, which may include one or both of the ECC 606 or the CRC 608 (of FIG. 6). CRC/ECC block 702 may perform a reliability check of the data using the metadata. This may result in creating a version of the data that does not include the metadata, due to consumption of the metadata during the reliability check. The data output from the reliability check circuitry may be determined to include no errors. As illustrated, the data includes no errors and the data continues to the AES/MAC 616 where it is decrypted or authenticated.

The AES/MAC 616 may utilize metadata to perform the decryption or authentication. The AES/MAC 616 may detect errors in the data if the decryption or authentication is unsuccessful. Thus, the AES/MAC 616 may sometimes be included as a portion of the reliability check circuitry. Although illustrated as receiving the data (e.g., UDB0 and UDB1) together, either piece of data may be received after the other. In general, the data may be received by the AES/MAC 616 in the order in which the read request was transmitted if no errors are detected. If the AES/MAC 616 successfully decrypts and authenticates the data, it may be transmitted as signaling to the cache memory 112 where it is accessible to the requestor.

Figure 8:
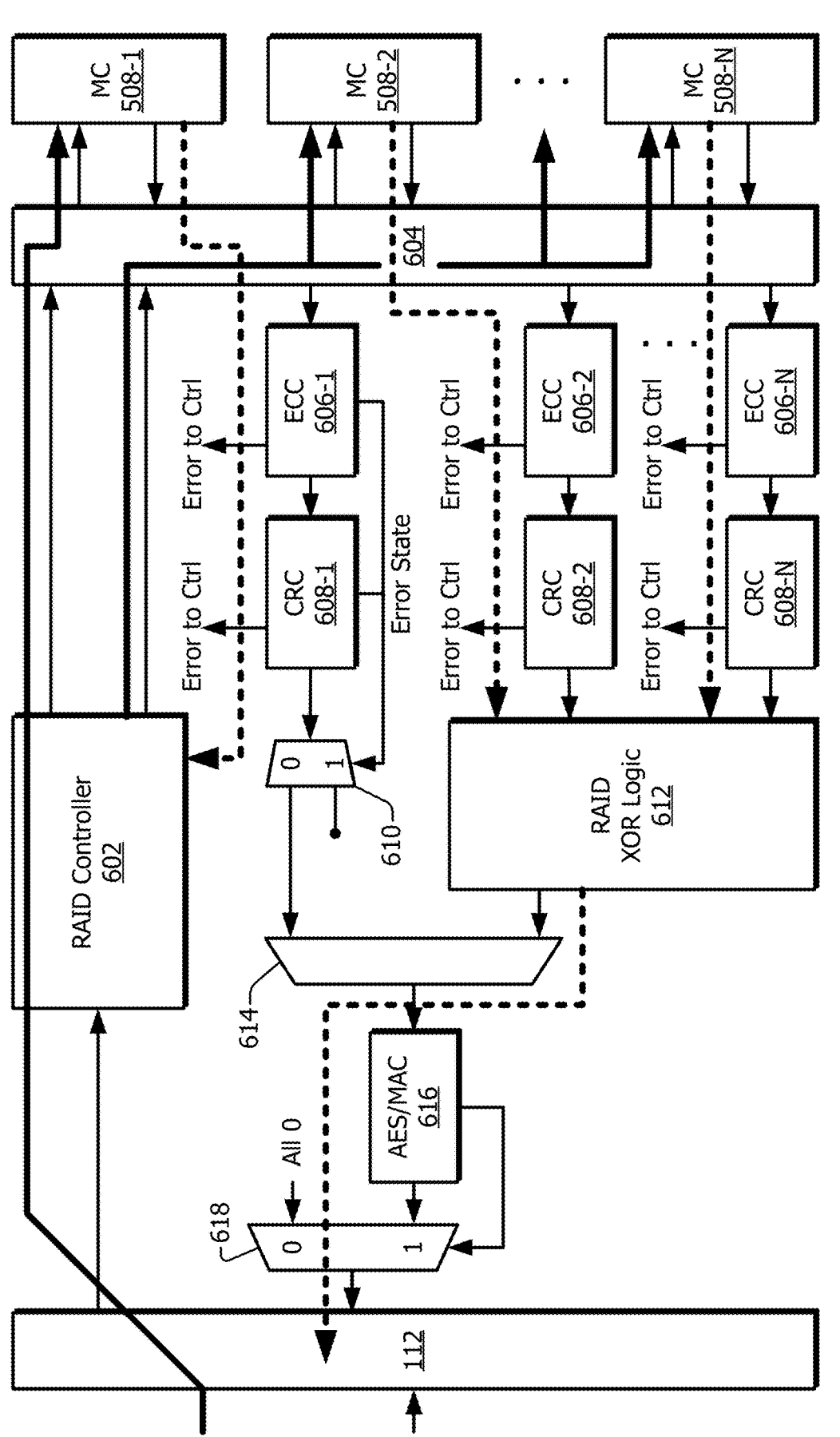
FIG. 8 illustrates an example system, including logic capable of implementing a read data path, performing a read operation that includes errors.

FIG. 8 illustrates an example system, including logic capable of implementing a read data path, performing a read operation that includes errors. As illustrated, the logic can be identical to the logic of FIG. 6. In contrast to FIG. 6, however, FIG. 8 illustrates the data path of a read operation that returns data determined to include an error. Requests are indicated as solid lines and returns are indicated as dotted lines.

The cache memory 112 receives signaling indicative of a request for data, which may or may not currently be stored in the cache memory 112. If the data is not currently stored in the cache memory 112, the cache memory 112 may transmit a request to read the data from memory (not shown). The RAID controller 602 receives signaling indicative of a request to read a cache line, including the requested data, from memory. If the cache line is longer than a data width of the memory device, the RAID controller 602 may parse the cache line read request into multiple read requests. A first read request is transmitted to a memory controller 508-1 associated with the memory that stores the requested data. The memory controller 508-1 may receive the signaling indicative of the read request through the interconnect 604.

In response to the memory controller 508-1 receiving the read request signaling, the memory device may transmit signaling to a memory to read and return the requested data. When the data is returned to the memory controller 508-1, the signaling indicative of the data and associated metadata returned from memory may be forwarded through the interconnect 604 to the reliability check circuitry. The reliability check circuitry may include one or more of the ECC 606, the CRC 608, or the AES/MAC 616. The reliability check circuitry may include one or more parallel copies of the reliability check circuitry to perform reliability checks of data in parallel (e.g., for a data recovery path and a no-error return path). In aspects, when the system is performing return operations that are not related to data recovery (e.g., the no-error data path), the memory controller 508 may forward the data to a first reliability check circuit. Each copy of the reliability check circuitry may be associated with a particular memory controller 508 or an operation type of the system (e.g., no-error operation or data recovery).

As illustrated, an error has not yet been detected in the data returned from memory, so the data may propagate along a first reliability check circuit associated with no-error return operations. The data is transmitted to the ECC 606-1 where the metadata is used to perform the error detection or correction. If an error is detected, it may be corrected, or an error may be transmitted to the RAID controller 602. If an error is detected or the ECC 606-1 is unable to correct the error, an error state may be altered in the MUX 610. If, however, no errors are detected or the errors are corrected, the data may continue to the CRC 608-1 where a checksum may be used to check the data.

The CRC 608-1 may determine if the data includes an error. If an error is detected by the CRC 608-1, an indication of the error may be transmitted to the RAID controller 602 or an error state may be altered in the MUX 610. As described with respect to FIG. 6, the reliability check circuitry may utilize metadata to perform the reliability check. The metadata may be consumed during the check to output a version of the data that does not include the metadata. As illustrated in FIG. 8, the reliability check circuitry determines that the data includes an error, and an indication of the error is forwarded to the RAID controller 602.

The RAID controller 602 may respond to the error by beginning a data recovery process. The RAID controller 602 may transmit read requests to retrieve other data from the RAID stripe that holds the corrupted data to recover the corrupted data. If other cache misses have occurred at the cache memory 112 during fetching of the corrupted data, or if the RAID controller 602 split the cache line read into multiple read requests, the RAID controller 602 may begin the data recovery process before, during, or after, transmitting memory requests associated with these other read operations. In aspects, the RAID controller 602 transmits signaling to the other memory controllers 508-2 through 508-N that couple to memory storing portions of the RAID stripe that are not the corrupted data. One or more of the memory controllers 508-2 through 508-N may be usable to access parity data or other redundancy data that, if combined with the other data in the RAID stripe, may create a version of the corrupted data without errors.

Each of the respective data and associated metadata retrieved by each memory controller 502-2 through 502-N may be transmitted through the interconnect 604 to reliability check circuitry. This reliability check circuitry may be different but parallel to the reliability check circuitry described above. In aspects, the reliability check circuitry may include multiple copies or instances of such circuitries. The number of copies may be equal to the number of memory controller total or the number of memory controllers within a RAID stripe. As illustrated, the logic includes N copies of the reliability check circuitry. Each copy of the reliability check circuitry may operate in parallel, or some may operate while others are idle. The respective data and associated metadata may be passed through the reliability check circuitry (e.g., ECC 606-2 through 606-N and CRC 608-1 through 608-N), and errors may or may not be detected within the data. If errors are detected, they may be transmitted to the RAID controller 602, and the data recovery process (if available) may begin with respect to that error. If no errors are detected, however, each of the respective data paths may be transmitted to the RAID XOR logic 612 where they are combined to produce a version of the corrupted data that does not include any errors.

This version of the corrupted data may be transmitted to the arbiter 614 where the signals transmitted along the no-error (e.g., non-data recovery) path and the data recovery path are arbitrated. Before, during, or after the data recovery process, other data may have been returned (e.g., as a result of an additional read request for the cache line read or a new cache line read). This data and the data that has been recovered may have passed the one or more reliability checks in parallel, causing the data to transmit to the arbiter 614 during a substantially same time period. As a result, the arbiter 614 may arbitrate between the two paths in any number of ways. For example, the arbiter 614 may be configured to select the normal data path to be transmitted first, select the data recovery data path to be transmitted first, or arbitrate between the paths in a round-robin manner that selects different paths at different moments in time. Any of the described arbitration methods or any other arbitration method may be used to arbitrate between the parallel paths of data.

In the illustrated example, the data recovered through the RAID techniques are transmitted from the arbiter before or after data on the normal data path. The data is transmitted to the AES/MAC 616 where it is decrypted or authenticated. The decryption and authentication are successful, causing the AES/MAC 616 to transmit a no error state to the MUX 618. As a result, the decrypted and authenticated data is transmitted through the MUX 618 and stored in the cache memory 112.

Figure 9:
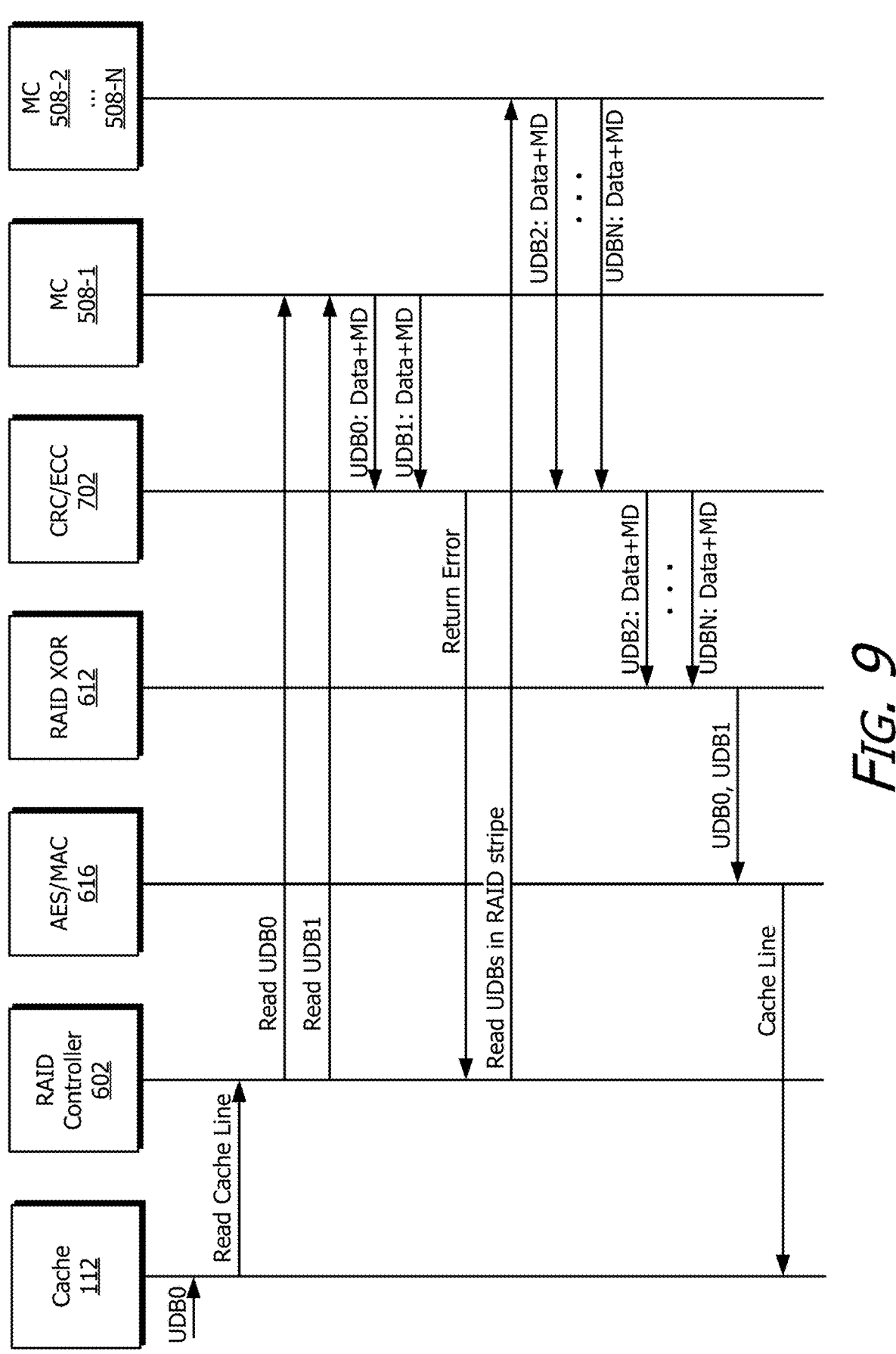
FIG. 9 illustrates an example sequence diagram of a system that is capable of implementing a read data path performing a read operation that includes errors.

FIG. 9 illustrates an example sequence diagram of a system capable of implementing a read data path performing a read operation that includes errors. The cache memory 112 receives signaling indicative of a request for data (e.g., UDB0). The cache memory 112 determines that the data is not currently stored within the cache memory 112 and transmits signaling to the RAID controller 602 that is indicative of a request to read a cache line into the cache memory 112. The RAID controller 602 parses the cache line read request into two read requests for UDB0 and UDB1, respectively. The RAID controller 602 transmits signaling indicative of the read requests to the memory controller 508-1.

The memory controller 508-1 receives the data and accompanying metadata from memory (not shown) and transmits the data to the CRC/ECC 702 where a reliability check is performed. The CRC/ECC 702 detects one or more errors within the data. The errors may be determined in the first data (e.g., UDB0), the second data (e.g., UDB1), or both. The detected errors are transmitted to the RAID controller 602. The RAID controller 602 transmits signaling indicative of read requests to the other memory controllers 508-2 through 508-N controlling memories that store the other data usable to recover the corrupted data.

The memory controllers 508-2 through 508-N receive the data and the accompanying metadata from each of the respective memories. The data is provided to the CRC/ECC 702 where the metadata is used to perform a reliability check. As a result of the reliability check, the data is not determined to include errors, so the data is passed to the RAID XOR logic 612 where one or more logical operations are performed to combine the data and create a version of the corrupted data that does not include errors. The data without errors is provided to the AES/MAC 616 where it is decrypted or authenticated. After decryption and authentication, the data is stored as a cache line in the cache memory 112 to be accessed by the requestor.

Example Methods

Figure 10:
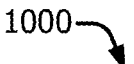
FIG. 10 illustrates an example method for implementing a read operation that does not include errors in accordance with one or more aspects of a read data path for a memory system.
Figure 10:
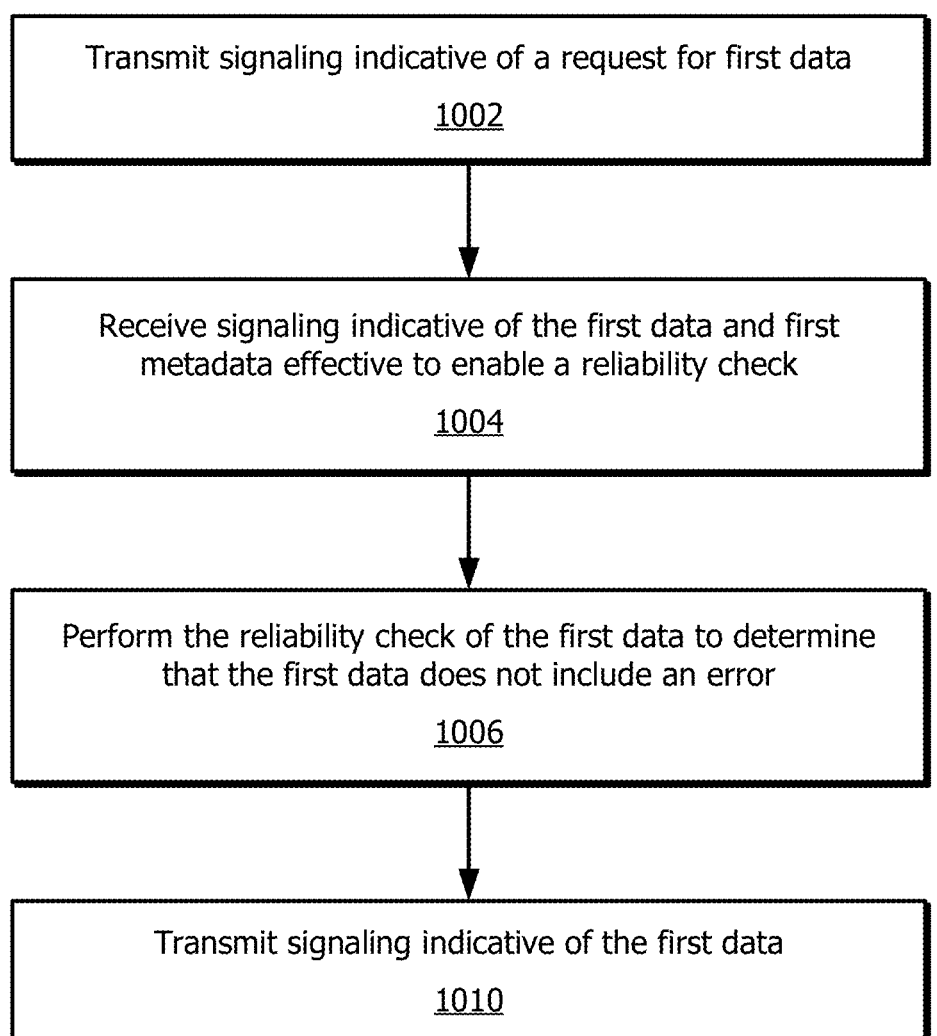

This section describes example methods with reference to the flow charts of FIGS. 10 and 11 for implementing a read data path. These descriptions may also refer to components, entities, and other aspects depicted in FIGS. 1 through 9, reference to which is made only by way of example. In aspects, the following example methods can be at least partially performed by the RAID logic 114 or the memory controller 116 or the memory controller 408 (in this section referred to generally as the memory controller 508). In other implementations, the example methods can be implemented at different functional places in the memory-access chain (e.g., at another controller in the host device 104 or the memory device 108).

FIG. 10 illustrates an example method 1000 for implementing a read operation that does not include errors in accordance with one or more aspects of a read data path for a memory system. The method 1000 may provide operations for a read operation when reliability check circuitry does not detect an error within the retrieved data.

At 1002, the RAID controller 602 transmits signaling indicative of a first request to read first data from memory. The first data may be located within a first set of one or more RAID stripes 504. The signaling may be transmitted to a memory controller 508-1 coupled to a memory rank 502-1 storing the first data. The signaling may include a first request to read a first portion of the first data and a second request to read a second portion of the first data, for instance, as two read requests resulting from a single cache line read. The memory controller 508 may retrieve the first data from memory alongside metadata that provides information about the first data.

At 1004, signaling indicative of the first data and the first metadata are received. The signaling may be received from the memory controller 508-1. The first metadata may be effective to enable a reliability check of the first data. For instance, the first metadata may include one or more bits related to an ECC of the first data, one or more bits associated with a CRC checksum of the first data, or one or more bits associated with a key (e.g., private key) or signature to decrypt or authenticate the data.

At 1006, a reliability check is performed on the first data to determine that the first data does not include an error. The reliability check may include the ECC 606, the CRC 608, or the AES/MAC 616. The reliability check circuitry may consume the first metadata during the reliability check to create a version of the first data that does not include the first metadata. In aspects, the reliability check may detect or correct errors within the data received from the memory controller 508-1. The ECC 606 may determine that no bit errors are present within the first data. The CRC 608 may determine that the first data passes a cyclic redundancy check. The AES/MAC may decrypt or authenticate the data.

At 1010, signaling indicative of the first data may be transmitted to the cache memory 112 to be stored. The signaling may be transmitted responsive to determining that the first data does not include an error. The first data may be stored within the cache memory 112 to be accessed by the requestor that initiated the read request at the cache memory 112. In doing so, data may be reliably read from memory and stored within a cache.

FIG. 11 illustrates an example method 1100 for implementing a read operation that includes errors in accordance with one or more aspects of a read data path for a memory system. The method 1100 may provide operations for a read operation when reliability check circuitry detects an error within the retrieved data. As such, portions of the method 1100 may describe a data recovery process in accordance with one or more aspects of a RAID architecture. The method 1100 may involve determining that an error exists within initially returned data. Thus, the method 1100 may optionally begin at 1004 of FIG. 10 where first data is received from the memory controller 508-1.

At 1102 a reliability check is performed on the first data to determine that the first data includes an error. The reliability check may be similar to the reliability check described in FIG. 10 at 1006. When an error is detected within the first data, the error may be reported to the RAID controller 602 or to the MUX 610. By reporting the error to the MUX 610, an error state of the MUX 610 may be altered to cause the corrupted first data to be discarded, thereby preventing corrupted data from propagating through the circuit. By reporting the error to the RAID controller 602, the RAID controller 602 may transmit additional memory requests to perform a data recovery process.

At 1104, signaling indicative of a request for second data is transmitted. The signaling may be transmitted by the RAID controller 602 in response to receiving signaling indicative of the error detected by the reliability check circuitry. The second data may include other data within the one or more RAID stripes 504 that stores the corrupted data. This other data may include parity data that, when combined with the other data from the one or more RAID stripes 504, produces a version of the corrupted data without errors. Thus, the signaling indicative of the request for the second data may be transmitted to multiple memory controllers 508-2 through 508-N each coupled to respective memory ranks 502-2 through 502-N. In doing so, the RAID controller 602 may transmit the signaling to different memory controllers (e.g., memory controller 508-2 through 508-N) than the memory controller 508-1 that received the request to read the first data.

At 1106, signaling indicative of the second data is received. The signaling may include the second data and second metadata usable to enable a reliability check of the second data. The second data may include data from multiple memory ranks (e.g., memory ranks 502-2 through 502-N). The second data may be stored in a same RAID stripe 504 as the first data. The second data may be transmitted to the reliability check circuitry where a reliability check is performed. The reliability check circuitry may include multiple copies of the reliability check circuitry that operate in parallel on the respective sets of data returned from each memory controller. If it is determined that the second data includes an error, the data recovery process may begin again with respect to the second data. If an error is not detected, the second data may be propagated further along the data line.

At 1108, logical operations are performed on the second data to create return data indicative of a version of the first data that does not include the error. The logical operations may be performed by the RAID XOR logic 612 to combine the various data paths that transmit the second data. The logical operations may combine the other data within the one or more RAID stripes 504 and the parity data to recover the corrupted data.

At 1110, signaling indicative of the return data is transmitted. The signaling may be transmitted to a cache memory 112 where it is stored such that it is accessible to a requester that initiated the read request. The return data may undergo decryption or authentication before being transmitted to the cache memory 112. By performing the method 1100, a read operation that ensures the reliability of the returned data may be implemented.

For the example flow diagram and methods described above, the orders in which operations are shown and/or described are not intended to be construed as a limitation. Any number or combination of the described operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses or components shown in FIGS. 1 through 9, the components of which may be further divided, combined, rearranged, and so on. The devices and components of these figures generally represent hardware, such as electronic devices, packaged modules, IC chips, or circuits; firmware or the actions thereof; software; or a combination thereof. Thus, these figures illustrate some of the many possible systems or apparatuses capable of implementing the described methods.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although this document describes implementations for a read data path in language specific to certain features or methods, the subject of the appended claims is not limited to the described features or methods. Instead, this document discloses the described features and methods as example implementations of a read data path.

What is claimed is:

1. An apparatus comprising:

a random-access memory (RAM) configured to store data using a redundant array of independent disks (RAID) architecture including at least one RAID stripe; and logic coupled to the RAM, the logic comprising:

a first read data path configured to process, using the RAM, read requests corresponding to data without an error from the data stored by the RAM; and a second read data path configured to process, using the RAM, read requests corresponding to data with an error from the data stored by the RAM, the logic configured to operate the first read data path and the second read data path at least partially in parallel, the first read data path comprising a first logic block configured to perform a reliability check on the data, which is received from the RAM and is stored in the at least one RAID stripe, using metadata of the data to determine between the read requests corresponding to the data without an error and the read requests corresponding to the data with an error, the first read data path configured to forward the data corresponding to each read request responsive to the data of the read request passing the reliability check and being determined to be the data without an error, and the first read data path configured to prevent use of the data corresponding to each read request responsive to the data of the read request failing the reliability check and being determined to be the data with an error.

2. The apparatus of claim 1, further comprising:

multiple memory controllers coupled between the logic and the RAM, wherein:

the RAM comprises multiple memory dies; and at least one respective memory die of the multiple memory dies is coupled to a respective memory controller of the multiple memory controllers.

3. The apparatus of claim 2, wherein:

the multiple memory dies comprise multiple sets of memory dies;

a respective set of memory dies of the multiple sets of memory dies is coupled to a respective memory controller of the multiple memory controllers;

each respective set of memory dies of the multiple sets of memory dies corresponds to a memory rank of multiple memory ranks; and the logic is configured to stripe RAID data across the multiple sets of memory dies to store a portion of the RAID data per memory rank of the multiple memory ranks.

4. The apparatus of claim 1, wherein:

the logic comprises an arbiter configured to provide (i) return data without an error and (ii) recovered return data to requesting circuitry by arbitrating between (i) the first read data path and (ii) the second read data path, respectively.

5. The apparatus of claim 4, wherein:

the second read data path is configured to produce the recovered return data for the data with an error using other data and parity data from the at least one RAID stripe.

6. The apparatus of claim 1, wherein the first read data path comprises a multiplexer that is configured to:

forward the data to respond to the read request using the data without an error responsive to the data of the read request passing the reliability check; and prevent the data from propagating past the multiplexer so that the data with an error is not used to respond to the read request responsive to the data of the read request failing the reliability check.

7. The apparatus of claim 1, wherein the first logic block comprises at least one of:

an error correction code (ECC) block; or a cyclic redundancy check (CRC) block.

8. The apparatus of claim 1, wherein the logic is configured to:

control the second read data path to process another read request responsive to other data corresponding to the other read request failing the reliability check as performed by the first logic block of the first read data path.

9. The apparatus of claim 8, wherein the second read data path comprises:

recovery logic configured to produce recovered data to replace the other data corresponding to the other read request using a RAID stripe that included the other data corresponding to the other read request.

10. The apparatus of claim 9, wherein the recovery logic comprises:

RAID exclusive-or (XOR) logic configured to produce the recovered data using multiple portions of the RAID stripe that included the other data, the multiple portions including a portion with parity data and another portion with different data that is different from the other data corresponding to the other read request.

11. The apparatus of claim 9, wherein:

the second read data path comprises a second logic block configured to perform a reliability check on a portion of the RAID stripe; and the second read data path comprises a third logic block configured to perform a reliability check on another portion of the RAID stripe.

12. The apparatus of claim 11, wherein the recovery logic is configured to:

receive the portion of the RAID stripe from the second logic block responsive to the portion passing the reliability check performed by the second logic block;

receive the other portion of the RAID stripe from the third logic block responsive to the other portion passing the reliability check performed by the third logic block; and produce the recovered data using the portion of the RAID stripe and the other portion of the RAID stripe.

13. The apparatus of claim 9, wherein:

the other read request comprises a first read request, and the other data comprises first data, the first data corresponding to the first read request;

the recovery logic of the second read data path is configured to operate to produce the recovered data for the first read request during a first time period after the first read data path detects an error in the first data corresponding to the first read request;

the first read data path is configured to operate to provide second data without an error for a second read request during a second time period, the second data without an error corresponding to the second read request; and the first time period at least partially overlaps the second time period.

14. The apparatus of claim 9, wherein the logic comprises:

an arbiter coupled across the first read data path and the second read data path, the arbiter configured to:

receive the data without an error from the first read data path; and receive the recovered data from the recovery logic of the second read data path.

15. The apparatus of claim 14, wherein the arbiter is configured to:

determine selected data between the data without an error from the first read data path and the recovered data from the recovery logic of the second read data path based on an arbitration process; and forward the selected data to respond to a corresponding request for the selected data.

16. The apparatus of claim 15, wherein the arbiter is configured to implement the arbitration process by at least one of:

selecting the first read data path so that the data without an error is transmitted prior to the recovered data from the second read data path;

selecting the second read data path so that the recovered data is transmitted prior to the data without an error from the first read data path; or selecting between the first read data path and the second read data path in a round-robin manner to alternately transmit the data without an error and the recovered data.

17. The apparatus of claim 1, wherein:

the RAM comprises dynamic random-access memory (DRAM); and the apparatus comprises a compute express link (CXL) device.

18. A method comprising:

receiving, by logic, multiple requests corresponding to data stored in a random-access memory (RAM), the RAM configured in accordance with a redundant array of independent disks (RAID) architecture including at least one RAID stripe;

transmitting, by the logic to the RAM, multiple read requests corresponding to the data stored in the RAM;

performing a reliability check on received data, which is received from the RAM in response to the multiple read requests and is stored in the at least one RAID stripe, using metadata of the received data to determine between read requests corresponding to data without an error and read requests corresponding to data with an error;

processing, by a first read data path of the logic, one or more read requests of the multiple read requests based on the one or more read requests corresponding to the data without an error, including:

forwarding, by the first read data path of the logic, the data corresponding to each read request of the one or more read requests responsive to the data of the read request passing the reliability check and being determined to be the data without an error;

preventing, by the logic, propagation of data corresponding to at least one read request of the multiple read requests responsive to the data of the at least one read request failing the reliability check and being determined to be the data with an error; and processing, by a second read data path of the logic, the at least one read request of the multiple read requests based on the at least one read request corresponding to the data with an error, the processing by the second read data path being performed at least partially in parallel with the servicing processing by the first read data path.

19. The method of claim 18, further comprising:

receiving, by the logic from the RAM, first data corresponding to a first read request of the multiple read requests;

determining, by the first read data path, that the first data passes a first reliability check using first metadata of the first data;

forwarding, by the logic, the first data based on the determining that the first data passes the first reliability check;

receiving, by the logic from the RAM, second data corresponding to a second read request of the multiple read requests;

determining, by the first read data path, that the second data fails a second reliability check using second metadata of the second data;

preventing, by the logic, propagation of the second data based on the determining that the second data fails the second reliability check;

recovering, by the second read data path, a version of the second data without an error using a RAID stripe that included the second data and that includes other data and parity data;

receiving, by the logic from the RAM, third data corresponding to a third read request of the multiple read requests; and determining, by the first read data path, that the third data passes a third reliability check using third metadata of the third data at least partially during the recovering of the version of the second data without an error.

20. An apparatus comprising:

a cache memory;

a random-access memory (RAM) configured to store data using a redundant array of independent disks (RAID) architecture including at least one RAID stripe;

multiple memory controllers coupled to the RAM; and logic coupled between the cache memory and the multiple memory controllers, the logic configured to:

respond to requests for cache data from the cache memory using the data stored in the RAM; and perform a reliability check on received data, which is received from the RAM and is stored in the at least one RAID stripe, using metadata of the received data to determine between data without an error and corrupted data, the logic comprising:

a first read data path configured to provide the data without an error received from the RAM;

a second read data path configured to produce recovered data to replace the corrupted data received from the RAM; and an arbiter configured to:

receive the data without an error from the first read data path;

receive the recovered data from the second read data path; and selectively forward the data without an error or the recovered data for transmission to the cache memory in response to a corresponding request of the requests for cache data from the cache memory.

* * * * *